United States Patent [19]
Satoi

[11] Patent Number: 5,989,757
[45] Date of Patent: *Nov. 23, 1999

[54] COLOR FILTER MANUFACTURING METHOD

[75] Inventor: Tsunenobu Satoi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/701,729

[22] Filed: Aug. 22, 1996

[30] Foreign Application Priority Data

Aug. 25, 1995 [JP] Japan ................................. 7-217165
Aug. 12, 1996 [JP] Japan ................................. 8-212555

[51] Int. Cl.$^6$ .............................. G02B 5/20; G02F 1/1335
[52] U.S. Cl. ............................. 430/7; 347/102; 347/106; 427/8; 427/162; 427/379
[58] Field of Search ..................... 430/7, 321; 349/106; 347/102, 106, 1; 427/8, 162, 379

[56] References Cited

U.S. PATENT DOCUMENTS

| 4,313,124 | 1/1982 | Hara | 346/140 |
|---|---|---|---|
| 4,345,262 | 8/1982 | Shiratu | 346/140 |
| 4,459,600 | 7/1984 | Sato | 346/140 |
| 4,463,359 | 7/1984 | Ayata | 346/1.1 |
| 4,558,333 | 12/1985 | Sugitani | 346/140 |
| 4,608,577 | 8/1986 | Hori | 346/140 |
| 4,723,129 | 2/1988 | Endo | 346/140 |
| 4,740,796 | 4/1988 | Endo | 346/1.1 |
| 5,681,675 | 10/1997 | Kurauchi et al. | 430/7 |
| 5,716,740 | 2/1998 | Shiba et al. | 430/7 |

FOREIGN PATENT DOCUMENTS

| 54-056847 | 8/1979 | Japan . |
|---|---|---|
| 59-075205 | 4/1984 | Japan . |
| 59-138461 | 8/1984 | Japan . |
| 59-123670 | 9/1984 | Japan . |
| 60-071260 | 4/1985 | Japan . |
| 63-235901 | 9/1988 | Japan . |
| 1217320 | 8/1989 | Japan . |
| 7281171 | 10/1995 | Japan . |

*Primary Examiner*—John A. McPherson
*Attorney, Agent, or Firm*—Fitzpatrick, Cella, Harper & Scinto

[57] ABSTRACT

A method of manufacturing a color filter through which the productivity of color filter manufacturing is improved is provided. The method of manufacturing a color filter by coloring a color filter substrate includes a partitioning step of partitioning the substrate into portions that are to be colored and portions that are not to be colored, a coloring step of coloring the portions planned for coloring by discharging ink onto these portions from an inkjet printing head, and a drying step of drying the ink discharged at the coloring step, the partitioning step, coloring step and drying step being performed successively.

23 Claims, 20 Drawing Sheets

WASHING

COATING OF INK RECEPTOR LAYER

COATING    PRE-BAKE

PATTERN EXPOSURE

PORTION WITH HYDROPHOBIC-PROPERTY

PORTION NOT WITH HYDROPHOBIC-PROPERTY

EXPOSURE    PEB

BJ-COLORING

COLORING    FIXING

CURING

CURING

FIG.21A
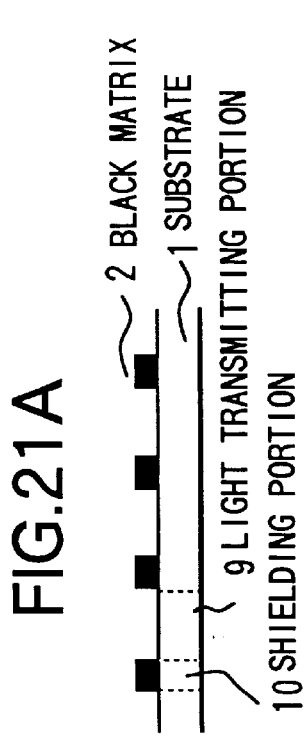
FIG.21B
FIG.21C
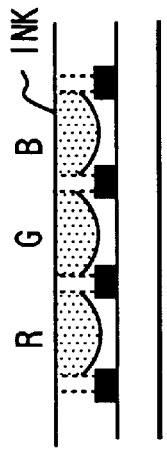
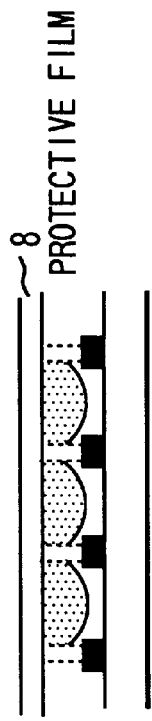
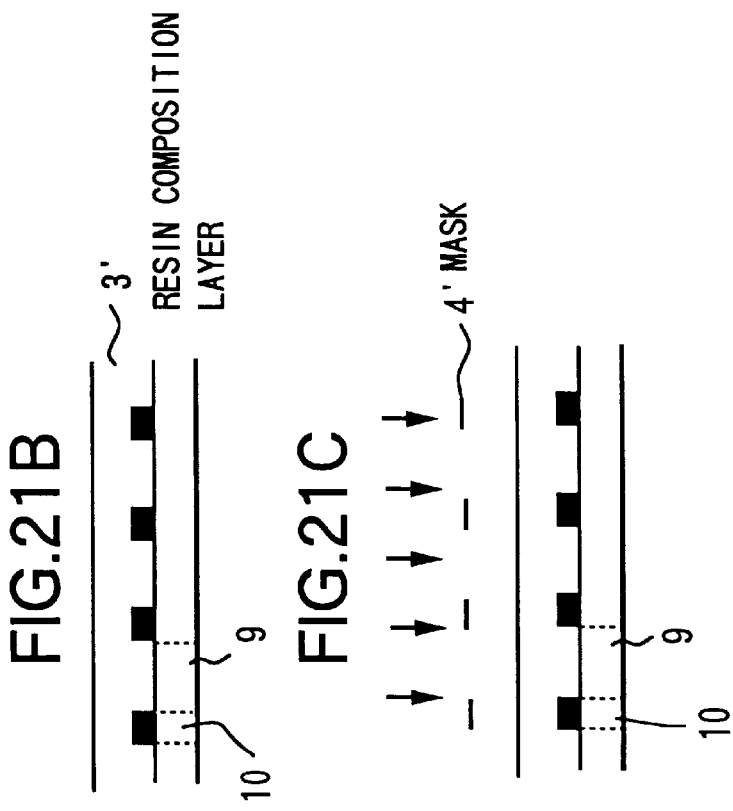
FIG.21D
FIG.21E
FIG.21F

COLOR FILTER MANUFACTURING METHOD

BACKGROUND OF THE INVENTION

This invention relates to a method and apparatus for manufacturing a color filter by coloring a color filter substrate, the color filter, a display device using the color filter, and an apparatus equipped with the display device.

Recent advances in personal computers, especially portable personal computers, have been accompanied by increasing demand for liquid crystal displays, particularly color liquid crystal displays. However, lowering the cost of liquid crystal displays is required to further the wider use thereof, and it is particularly important to lower the cost of color filters, which are relatively expensive. Various methods of meeting these demands while satisfying the characteristics required of color filters have been tried, but a method of satisfying all of these requirements has not yet been realized. The various methods that have been attempted will now be described.

A first method, which is that most widely used, is dyeing. This method includes coating a glass substrate with an aqueous polymer material consisting of a dyeing material, patterning the polymer material into a desired shape by photolithography and then dipping the pattern obtained into a dye solution to obtain a colored pattern. By repeating this three times, R (red), G (green), B (blue) color filter layers are formed.

A second method is pigment dispersion, which currently is in the process of supplanting the dyeing method. This method includes forming a photosensitive resin layer, in which a pigment has been dispersed, on a substrate, and patterning this layer to obtain a pattern of a single color. By repeating this three times, R, G, B color filter layers are formed.

A third method is electrodeposition. This method includes forming transparent patterns on a substrate and electrodepositing a first color by dipping the substrate in an electrodeposition coating solution containing pigment, resin and an electrolyte, etc. Color filter layers of the colors R, G, B are formed by repeating this process three times. This is followed by calcination.

A fourth method is printing. This includes dispersing pigment in a thermosetting resin and repeating printing three times to apply the three colors R, G, B, after which the resin is thermoset to form colored layers.

In general, a protective layer is formed on the colored layers in each of the methods mentioned above.

What these methods have in common is that it is required that the same process be repeated three times in order to achieve coloring in the three colors R, G, B. This increases cost. An additional problem is that the greater the number of steps, the lower the yield. Furthermore, in the electrodeposition method, the shapes of the patterns that can be formed are limited. For this reason, this method cannot be applied to TFT applications. The printing method cannot form patterns at a fine pitch owing to poor resolution and smoothness.

To eliminate these shortcomings, methods of manufacturing color filters using an inkjet method have been disclosed in the specifications of Japanese Patent Application Laid-Open (KOKAI) Nos. 59-75205, 63-235901 and 1-217320. These methods include spraying coloring solutions, which include pigments of the three colors R, G, B, on a light-transmitting substrate by the inkjet method and drying each of the coloring solutions to form a colored image area. The inkjet method makes it possible to form R, G, B pixels at one time. The advantages obtained are a greatly simplified manufacturing process and a major reduction in cost.

However, in the conventional method of manufacture based upon the inkjet method described above, a series of steps from a step for forming an ink-absorbing receptor layer on a color filter substrate to a step for coloring the receptor layer and curing the receptor layer is not performed continuously. The result is poor productivity.

SUMMARY OF THE INVENTION

Accordingly, an object of the present invention is to provide a color filter manufacturing method and apparatus through which the productivity of color filter manufacture is improved.

Another object of the invention is to provide a color filter manufactured by the method and apparatus mentioned above, a display device that uses the color filter and an apparatus equipped with this display device.

According to the present invention, the foregoing objects are attained by a method of manufacturing a color filter by coloring a color filter substrate, comprising a partitioning step of partitioning the substrate into a portion which is to be colored and a portion that is not to be colored, a coloring step of coloring the portion to be colored by discharging ink from an inkjet head, and a drying step of drying the ink discharged at the coloring step, the partitioning step, coloring step and drying step being performed successively.

The invention further provides an apparatus for manufacturing a color filter by coloring a color filter substrate, comprising a partitioning unit for partitioning the substrate into a portion which is to be colored and a portion that is not to be colored, a coloring unit for coloring the portion to be colored by discharging ink from an inkjet head, and a drying unit for drying the ink discharged by the coloring unit, the partitioning unit, coloring unit and drying unit being arranged in succession as a single manufacturing line.

The invention further provides a color filter manufactured by coloring a color filter substrate, the color filter being manufactured by successively executing a partitioning step of partitioning the substrate into a portion which is to be colored and a portion that is not to be colored, a coloring step of coloring the portion to be colored by discharging ink from an inkjet head, and a drying step of drying the ink discharged at the coloring step, the partitioning step, coloring step and drying step being performed successively.

The invention further provides a display device equipped with a color filter manufactured by coloring a color filter substrate, the display device comprising a color filter and light-quantity varying means integrated with the color filter for varying quantity of light, the color filter being manufactured by successively executing a partitioning step of partitioning the substrate into a portion which is to be colored and a portion that is not to be colored, a coloring step of coloring the portion to be colored by discharging ink from an inkjet head, and a drying step of drying the ink discharged at the coloring step, the partitioning step, coloring step and drying step being performed successively.

The invention further provides an apparatus having a display device, which is equipped with a color filter manufactured by coloring a color filter substrate, and image signal output means for outputting an image signal to the display device, wherein the display device comprises a color filter and light-quantity varying means integrated with the color filter for varying quantity of light, the color filter being manufactured by successively executing a partitioning step of partitioning the substrate into a portion which is to be colored and a portion that is not to be colored, a coloring step of coloring the portion planned for coloring by discharging ink from an inkjet head, and a drying step of drying the ink discharged at the coloring step, the partitioning step, coloring step and drying step being performed successively.

Other features and advantages besides those discussed above will be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 21A through 21F are diagrams illustrating another embodiment of steps for manufacturing a color filter.

DESCRIPTION OF THE PREFERRED EMBODIMENTS

Preferred embodiments of the invention will now be described in detail with reference to the accompanying drawings.

The steps for manufacturing a color filter by a color filter manufacturing apparatus according to an embodiment of the invention will be described with reference to FIGS. 1A through 1E.

In general, a glass substrate is used as a substrate 1 in this embodiment. As long as the substrate 1 exhibits the characteristics necessary for a liquid crystal color filter, such as transparency and mechanical strength, it is not limited to a glass substrate.

Figure 1A:
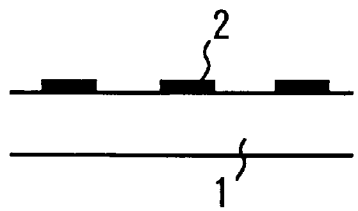
FIGS. 1A through 1E are diagrams illustrating the steps for manufacturing a color filter.

The first step [FIG. 1A] of the process is to wash the substrate 1, on which a black matrix 2 has been formed to clarify the boundaries of the individual pixels of the color filter and obtain a distinct image. A method available to form the black matrix includes forming a thin film of metal by sputtering or vapor deposition and then patterning the film by photolithography.

It is possible to form the black matrix using resin rather than metal. In such case formation is possible by a well-known method such as a gravure printing method, a photo-resist method or a thermal transfer method. If the printing method is used, it is preferred that a resin having as low a polarity as possible be used as the binder of the resin. With the photoresist method, it is possible to use even an ordinary photoresist. In order to lower critical surface tension, however, photosensitive and silicone rubber layers should be built up and water- and oil-repellent layers formed selectively by exposure to light and development. Alternatively, a fluorine- or silicone-based water or oil repellency agent may be added to the resist in advance. Examples of resins for forming the black matrix include polypropylene hexafluoride, polyethylene tetrafluoride, polyethylene trifluoride, polydimethylsiloxane, polyvinylidiene fluoride, poly-1,2-butadiene, polyvinyl fluoride, polyethylene, polybutadiene, polystyrene and styrene-butadiene copolymer. However, resins that can be used are not limited to these; any resin exhibiting a low critical surface tension from the standpoint of ink repellency is suitable. More than one of these types of resin may be used in combination. Depending upon the particular case, resins having a critical surface tension greater than 35 dyne/cm can be combined. Further, in a case where the critical surface tension is high and adequate ink repellency cannot be obtained with a resin alone, the critical surface tension may be lowered by adding a silicone- or fluorine-type water/oil repellency agent. A black coloring agent such as a pigment of carbon black or titanium black or a black dye can be used.

Figure 1B:
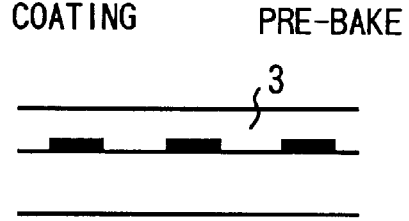

Next, as shown in FIG. 1B, the substrate 1 on which the black matrix 2 has been formed is coated with a coating material that will serve as an ink receptor layer 3, the solvent in the coating material is caused to vaporize by prebaking and then the material is dried. This forms the ink receptor layer 3, which has portions that will be irradiated with light. By virtue of subsequent irradiation with light and heat treatment, the irradiated portions will not readily absorb ink. The coating material used is a resin composition the exposed portions of which are subjected to exposure and heat treatment so that they will not absorb ink. The purpose of this is to prevent the mixing of ink colors and the dispersion of more ink than necessary utilizing the fact that a difference in ink absorbency develops between the exposed and unexposed portions.

Figure 1C:
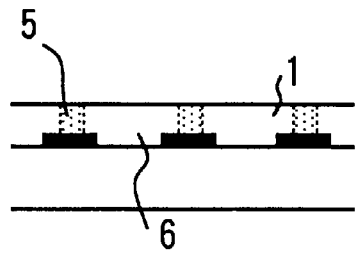

Next, as shown in FIG. 1C, the coating material at the portions shielded by the black matrix 2 is subjected to pattern exposure via a mask and to a heat treatment PEB (post-exposure baking), whereby the portions shielded by the black matrix 2 are changed to portions having such property that ink will not readily be absorbed. This is a process for providing these portions with a hydrophobic property. To prevent whitening of pixels, it is preferred that the width of the coating material subjected to the hydrophobic-property inducing treatment be made narrower than the width of the black matrix 2, as shown in of FIG. 1C.

Figure 1D:

This is followed by coloring a portion 6, which has not been subjected to the hydrophobic-property inducing treatment, with inks of the colors R (red), G (green) and B (blue) using inkjet heads, and then allowing the ink to dry [FIG. 1D].

Figure 1E:

Next, a heat treatment is applied to cure the colored coating material (ink receptor layer 3) [FIG. 1E]. A protective film is formed if required. Examples of protective films that can be used include resin materials of the type cured by light, the type cured by heat or the type cured by both light and heat, or inorganic films formed by vapor deposition or sputtering, etc. Any protective layer that exhibits the transparency needed for a color filter and is capable of withstanding a subsequent ITO (indium tin oxide) forming process and alignment-film forming process, etc., can be used.

FIGS. 21A through 21F are diagrams illustrating another embodiment of steps for manufacturing a color filter.

In general, a glass substrate is used as the substrate 1 in this embodiment. As long as the substrate 1 exhibits the characteristics necessary for a liquid crystal color filter, such as transparency and mechanical strength, it is not limited to a glass substrate.

FIG. 21A illustrates the glass substrate 1 having the black matrix 2, which defines a light transmitting portion 9 and a shielding portion 10. First, since the substrate 1 on which the black matrix 2 has been formed exhibits little inherent ink receptivity, the substrate 1 is coated with a resin composition the characteristics of which are such that the resin composition will be endowed with good ink affinity under certain conditions (e.g., at least under irradiation with light or heating) and will cure under certain conditions. This is followed by prebaking if necessary. The result is formation of a resin composition layer 3' [FIG. 21B]. Coating methods such as spin coating, roll coating, bar coating, spray coating or dip coating can be used to form the resin composition layer 3' but the invention is not limited to these methods.

The resin layer is locally provided with affinity to ink [FIG. 21C] by subjecting the resin layer on the light transmitting portion 9 to pattern exposure in advance using a photomask 4', thereby forming a portion 6' provided with ink affinity and a portion 5' exhibiting no ink affinity in the resin composition layer 3' [FIG. 21D].

This is followed by discharging inks of the three colors R, G, B onto the resin composition layer 3' by the inkjet method [FIG. 21E] and then allowing the ink to dry if necessary. Inkjet methods available include a method relying upon thermal energy and a method relying upon mechanical energy, either of which is suitable for use. There is no limitation upon the inks that can be used as long as they are inks usable in inkjet techniques. The ink colorants are suitably selected from various dyes or pigments that are in accordance with the transmission spectra required for the R, G, B pixels.

Next, the resin composition layer 3' that has been colored is cured by being subjected to irradiation with light or to a combination of light irradiation and heat treatment, after which a protective layer 8 is formed if required [FIG. 21F]. To cure the resin composition layer 3', the layer is treated under conditions different from those used in the earlier treatment for endowing the layer with affinity to ink. For example, the amount of exposure in irradiation with light is increased, the heating conditions are made more severe or both light irradiation and heat treatment are applied.

In the description set forth above it is stated that the ink receptor layer 3 is formed on the substrate 1 and that the receptor layer is colored with inks. However, it is possible to delete the ink receptor layer 3 and discharge the inks directly into the openings of the black matrix on the substrate 1 to color the pixels. Even if the inks are discharged directly onto the substrate 1 in this manner, the formation of the protective layer is still optional just as in the case where the ink receptor layer 3 is provided.

Figure 2:
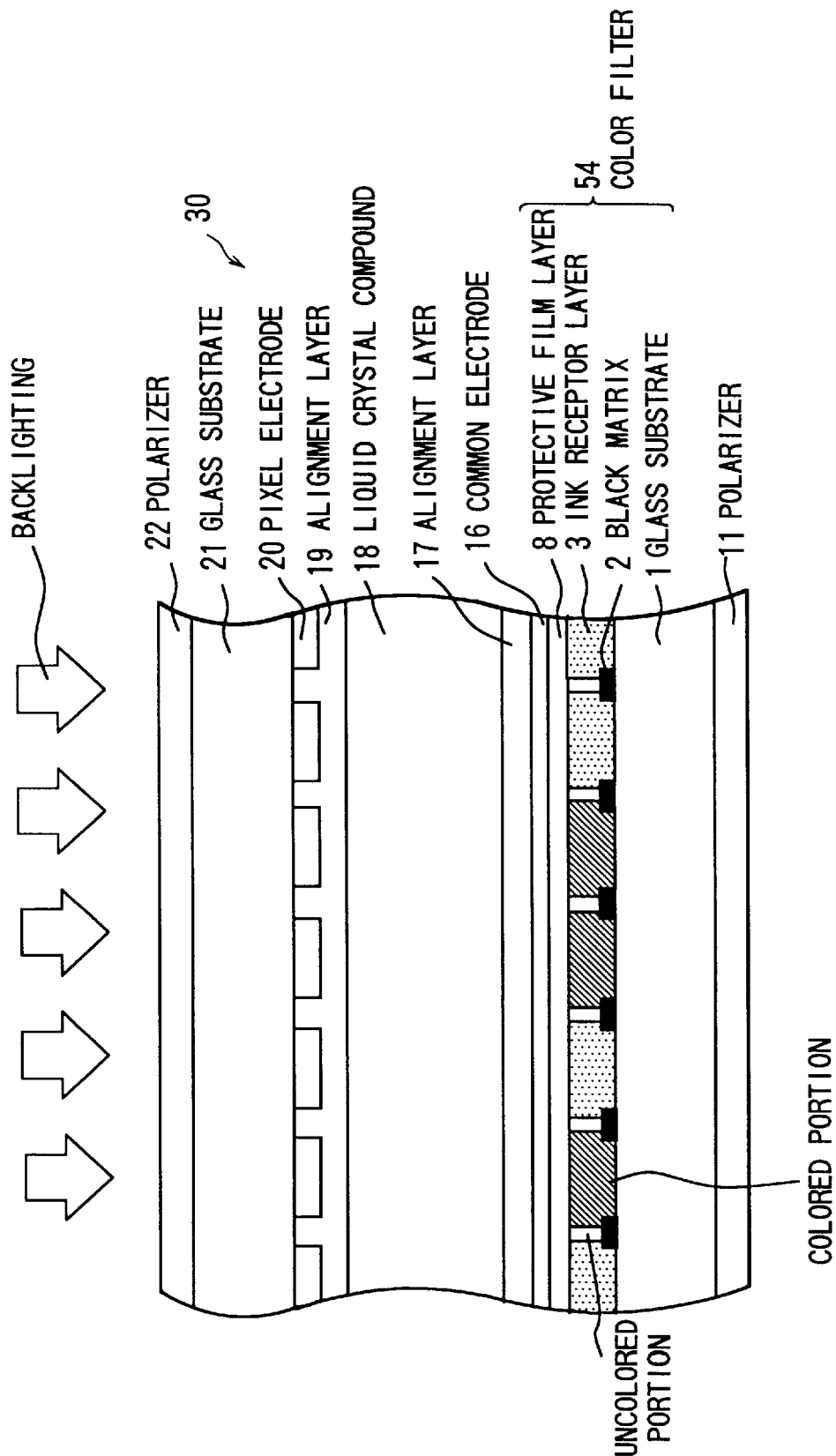
FIG. 2 is a sectional view illustrating the basic construction of a color liquid crystal display device incorporating a color filter according to an embodiment of the invention.
Figure 3:
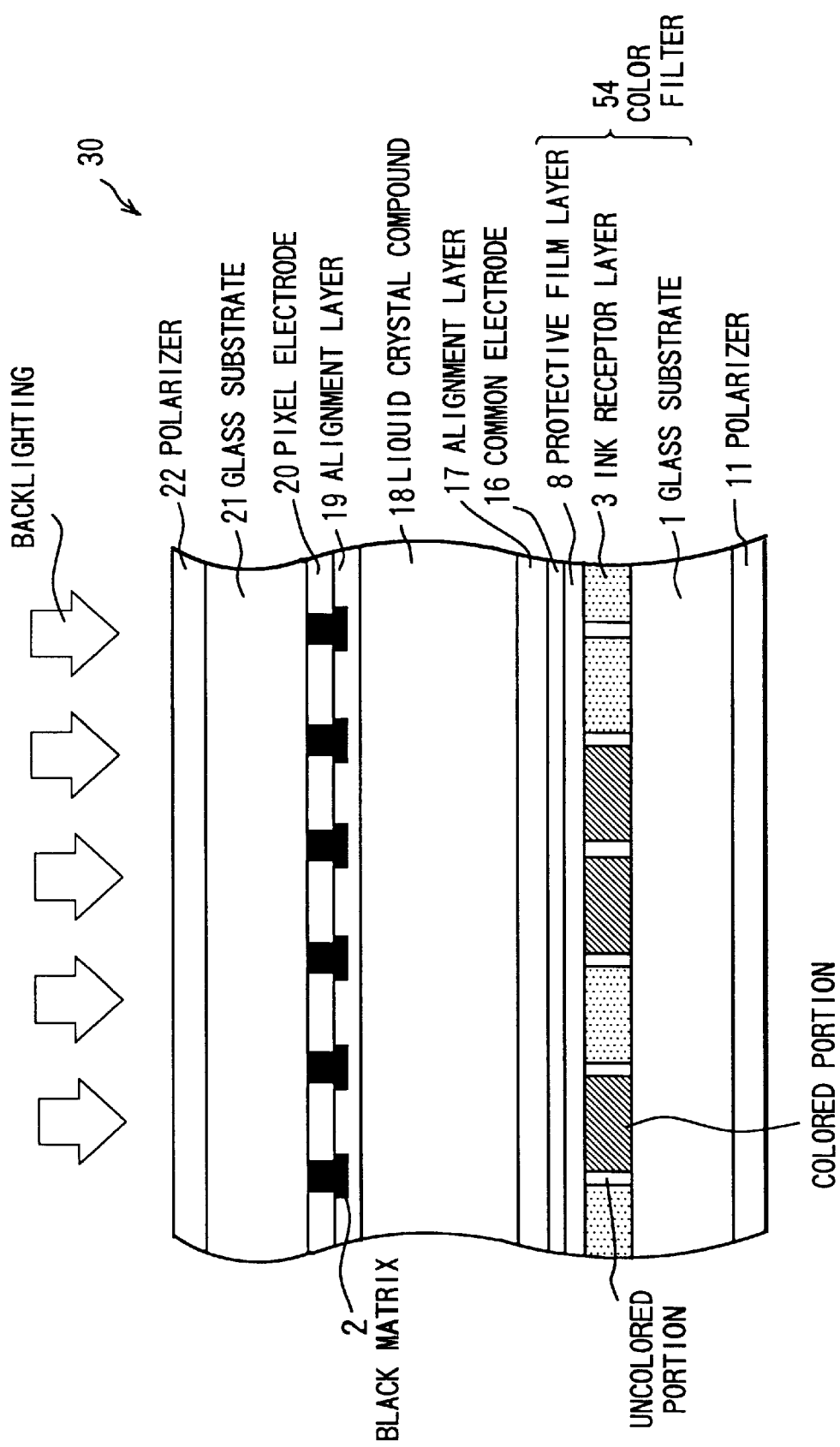
FIG. 3 is a sectional view illustrating the basic construction of a color liquid crystal display device incorporating a color filter according to an embodiment of the invention.

FIGS. 2 and 3 are sectional views of a TFT (thin film transistor) color liquid crystal display device 30 incorporating a color filter according to this embodiment. The form of the device is not limited to that of this example.

A color liquid crystal display device generally is formed by combining the color filter substrate 1 and an opposing substrate 21 and sealing a liquid crystal compound 18 between the two substrates. Thin film transistors (not shown) and transparent pixel electrodes 20 are formed in a matrix pattern on the inner side of the substrate 21, which is one of the two substrates in the liquid crystal device. A color filter 54 is disposed on the inner side of the other substrate 1 in such a manner that R, G, B colorants are arrayed at positions opposing the pixel electrodes. A transparent opposing electrode (common electrode) 16 is formed on one surface of the color filter 54. The black matrix 2 usually is formed on the side of the color filter substrate 1 (see FIG. 2). However, in a BM (black matrix) on-array liquid crystal panel, the black matrix 2 is formed on the side of the opposing TFT substrate (see FIG. 3). Furthermore, alignment layers 17 and 19 are formed on the inner sides of the respective substrates. Rubbing these alignment films makes it possible to align the liquid crystal molecules in a given direction. Polarizing plates 11, 22 are bonded to the outer sides of the respective glass substrates. The gap (on the order of 2–5 $\mu$m) between the two glass substrates is filled with liquid crystal compound 18. In general, a combination of a fluorescent lamp (not shown) and a diffuser (not shown) is used for backlighting. A display is presented by making the liquid crystal compound function as an optical shutter that changes the transmittance of the light from backlighting.

Figure 4:
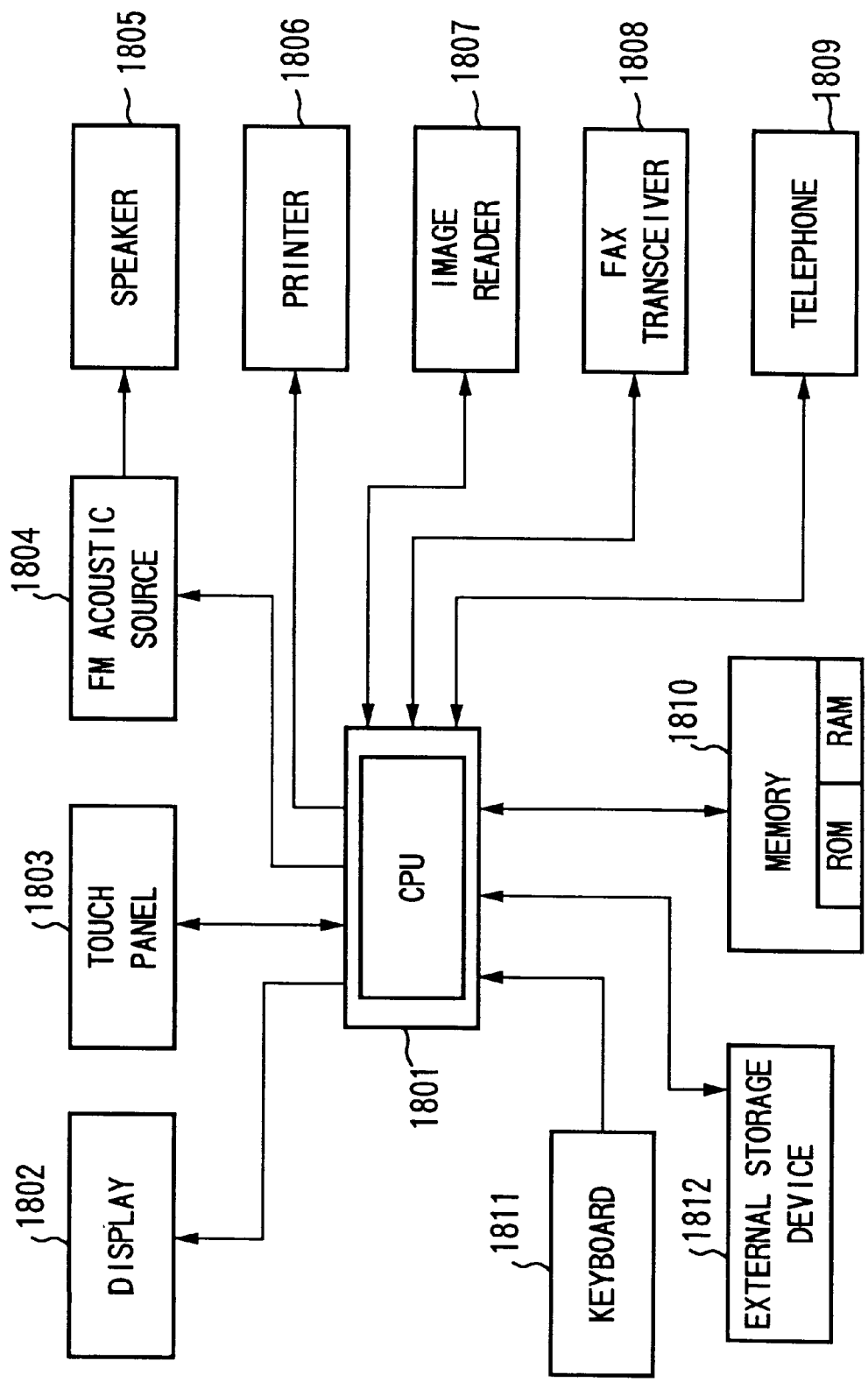
FIG. 4 is a block diagram illustrating an information processing apparatus in which the liquid crystal device is used.
Figure 5:
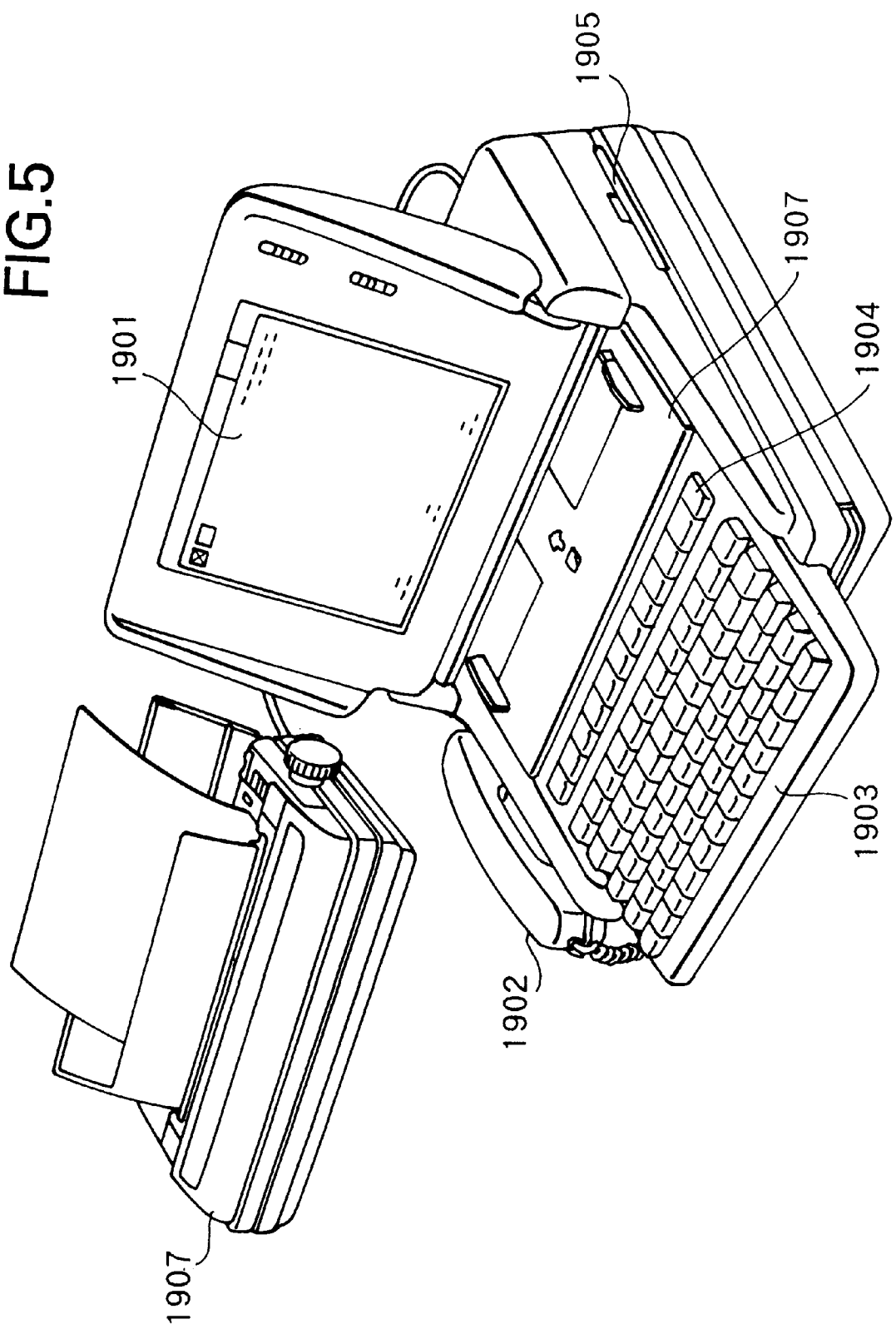
FIG. 5 is a perspective view illustrating the information processing apparatus in which the liquid crystal device is used.
Figure 6:
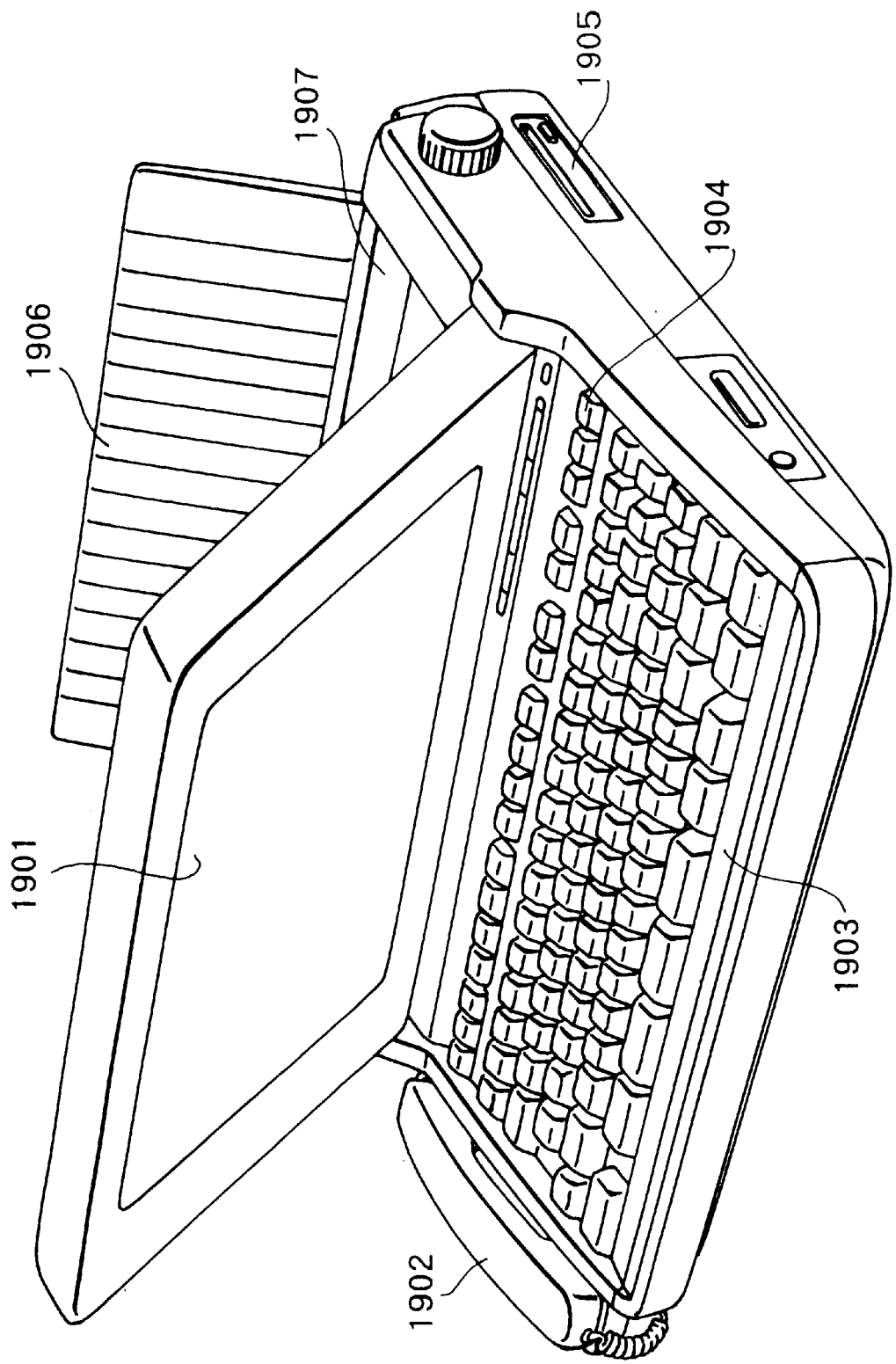
FIG. 6 is a perspective view illustrating the information processing apparatus in which the liquid crystal device is used.

FIGS. 4 through 6 illustrate an example of a case where this liquid crystal panel is applied to an information processing apparatus.

FIG. 4 is a block diagram showing the general architecture of a case where the liquid crystal panel described above is applied to an information processing apparatus capable of functioning as a word processor, a personal computer, a facsimile machine and a copier.

The apparatus includes a controller 1801 for overall control. The controller 1801 has a CPU such as a microprocesser and various I/O ports and performs control by outputting control and data signals to various units and receiving control and data signals as inputs from various units. A display unit 1802 has a display screen which displays various menus and document information as well as image data read by an image reader 1807. A transparent, pressure-sensitive touch panel 1803 is provided on the display unit 1802. By pressing the surface of the touch panel 1803 with a finger or the like, item entries and entries of coordinate positions can be made on the display unit 1802.

Musical information that has been created by a musical editor is stored beforehand in a memory unit 1810 or external storage device 1812 in the form of digital data. An FM (frequency modulating) acoustic source 1804 reads these digital data output of these memories and subjects the data to frequency modulation. An electric signal from the FM acoustic source 1804 is converted to an audible sound by a speaker 1805. A printing unit 1806 is used as the output terminal of the word processor, personal computer, facsimile machine and copier.

The image reader 1807 photoelectrically reads and enters document data and is provided in the path of document conveyance to read facsimile originals, copier originals and other originals.

A facsimile (FAX) transceiver 1808 transmits, in the form of a facsimile signal, document data read by the image reader 1807, receives a facsimile signal that has been transmitted to this apparatus and decodes this signal. The transceiver 1808 has an interface function for interfacing an external device. A telephone 1809 has various telephone functions such as the usual telephone function and an answering service function.

A memory 1810 includes a ROM for storing a system program, a manager program and application programs as well as character fonts and dictionaries, etc., a video RAM for storing application programs and document information loaded from the external storage device 1812, and a video RAM.

A keyboard 1811 is for entering document information and various commands.

The external storage device 1812 uses a floppy disk or hard disk as a storage medium and stores document information, music or voice information and user application programs.

FIG. 5 is an external view of the information processing apparatus illustrated in FIG. 4.

The apparatus has a flat-panel display 1901 that utilizes the liquid crystal panel described above. The display 1901 displays various menus, graphics information and document information, etc. Coordinates can be entered and items designated by pressing the surface of the touch panel 1803 on the display 1901 by a finger or the like. A handset 1902 is used when the apparatus functions as a telephone. A keyboard 1903 is detachably connected to the main body of the apparatus by a cord and is capable of entering various document information and data. The keyboard 1903 is provided with various function keys 1904. Numeral 1905 denotes a slot for inserting a floppy disk into the external storage device 1812.

Numeral 1906 denotes a paper rest. An original to be read by the image reader 1807 is placed upon the paper rest 1906, and an original that has been read by the reader is discharged from the back of the apparatus. Data received by facsimile reception are printed out by an inkjet printer 1907.

In a case where the information processing apparatus functions as a personal computer or word processor, various information that has entered from the keyboard 1811 is processed by the controller 1801 in accordance with a prescribed program and the processed information is outputted to the printer 1806 as an image.

In a case where the information processing apparatus functions as a facsimile receiver, facsimile information that has entered from the FAX transceiver 1808 is received and processed by the controller 1801 in accordance with a prescribed program and the processed information is outputted to the printer 1806 as a received image.

If the information processing apparatus functions as a copier, an original is read by the image reader 1807 and the data from the read original are outputted to the printer 1806 as a reproduced image via the controller 1801.

If the information processing apparatus functions as a facsimile transmitter, the data of an original read by the image reader 1807 are transmitted by the controller 1801 in accordance with a prescribed program, after which the data are transmitted to a communication line via the FAX transceiver 1808.

The information processing apparatus described above may be of the integrated type in which the inkjet printer is housed within the main body of the apparatus, as shown in FIG. 6. Such a configuration is more portable. Portions in FIG. 6 having functions identical with those of the apparatus shown in FIG. 5 are designated by like reference numerals.

Figure 7:
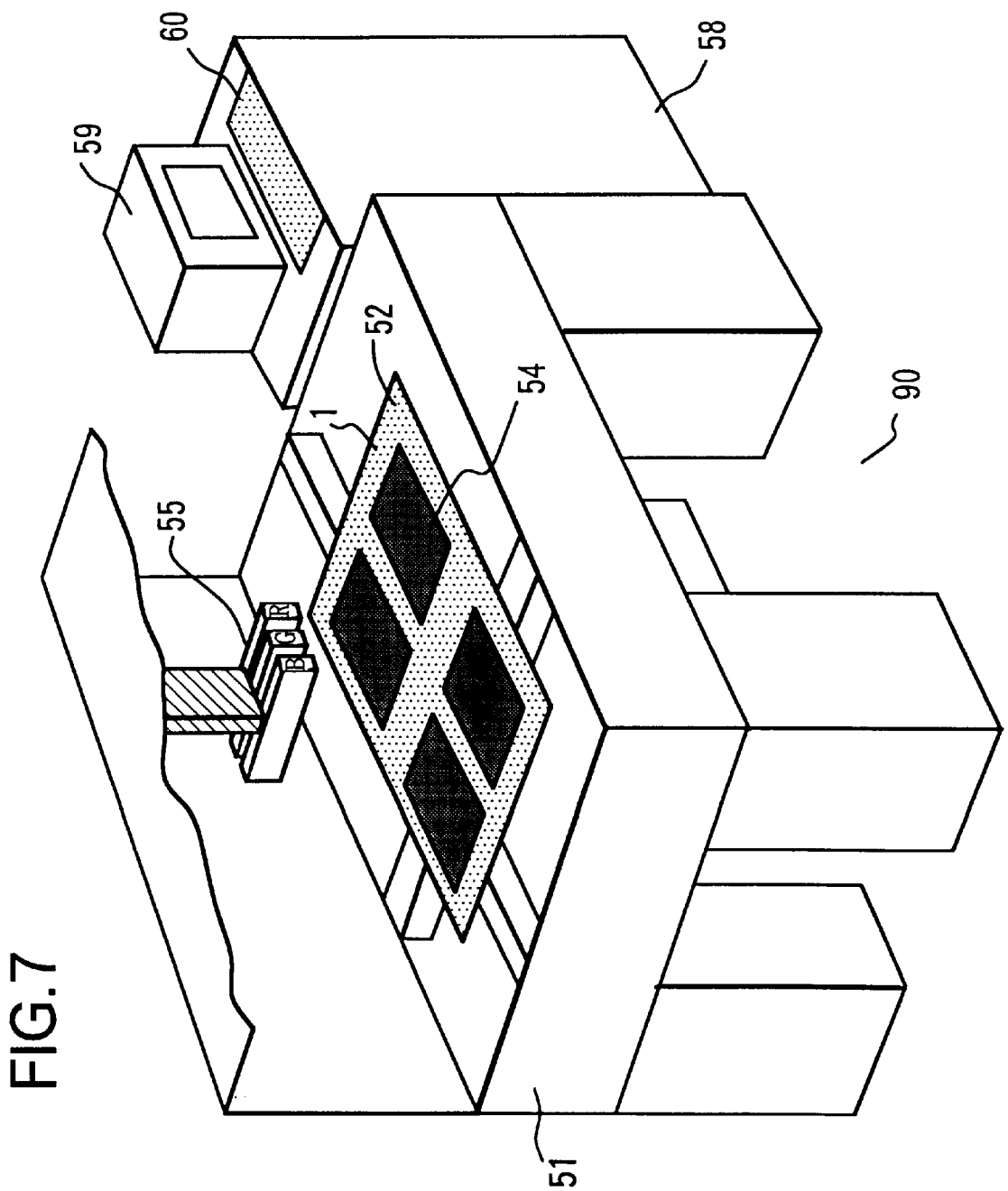
FIG. 7 is a schematic view illustrating the arrangement of an embodiment of a color filter coloring apparatus.

FIG. 7 is a schematic view illustrating the arrangement of an embodiment of a color filter coloring apparatus 90.

The apparatus 90 includes a base 51 and an X-Y-θ stage 52 disposed on the base 51. A color filter substrate 1 is placed on the X-Y-θ stage 52 and has a color filter 54 formed thereon. The apparatus 90 further includes R, G, B inkjet heads 55 for coloring the color filter 54. A controller 58 performs overall control of the color filter coloring apparatus 90 and has a teaching pendant (personal computer) 59 serving as the display of the controller, and a keyboard 60 serving as the control panel of the teaching pendant 59.

Figure 8:
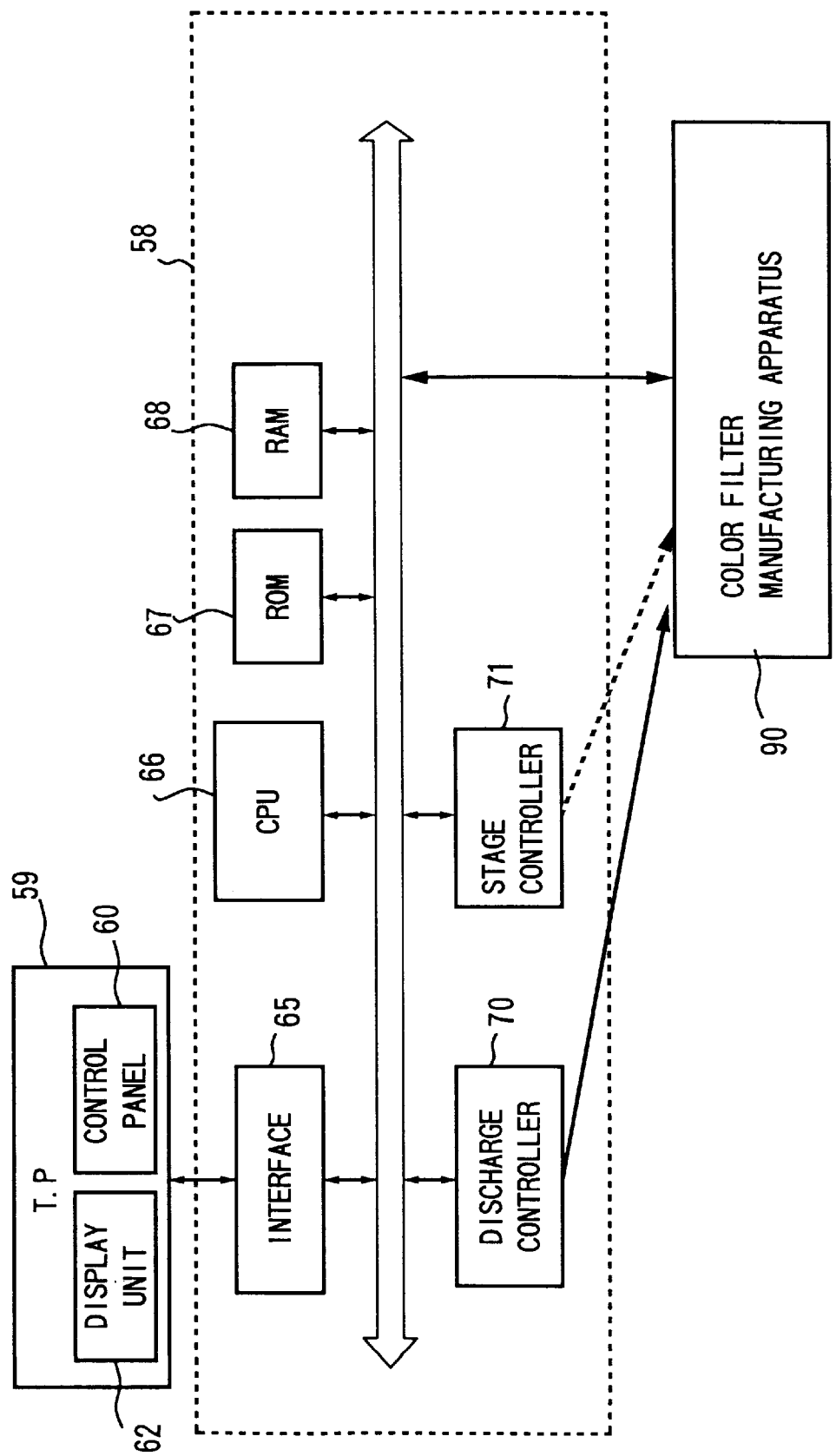
FIG. 8 is a diagram showing the architecture of a controller for controlling the operation of the color filter coloring apparatus.

FIG. 8 is a diagram showing the architecture of the controller for controlling the operation of the color filter coloring apparatus. Shown in FIG. 8 is the teaching pendant 59 serving as the input/output means of the controller 58. The pendant 59 has the control panel (keyboard) 60, which is for operating the color filter coloring apparatus 90, and a display unit 62 for displaying information indicating the progress of the coloring operation and information indicating whether the inkjet heads are operating abnormally.

The controller 58 controls the overall operation of the color filter coloring apparatus 90 and includes an interface 65 for exchanging data with the teaching pendant 59, a CPU 66 for controlling the color filter coloring apparatus 90, a ROM 67 which stores the control program for operating the CPU 66, a RAM 68 for storing production information and the like, a discharge control unit 70 for controlling discharge to each pixel of the color filter, and a stage control unit 71 for controlling operation of the X-Y-θ stage 52 of color filter coloring apparatus 90. The color filter coloring apparatus 90 is connected to the controller 58 and operates in accordance with commands from the controller 58.

Figure 9:
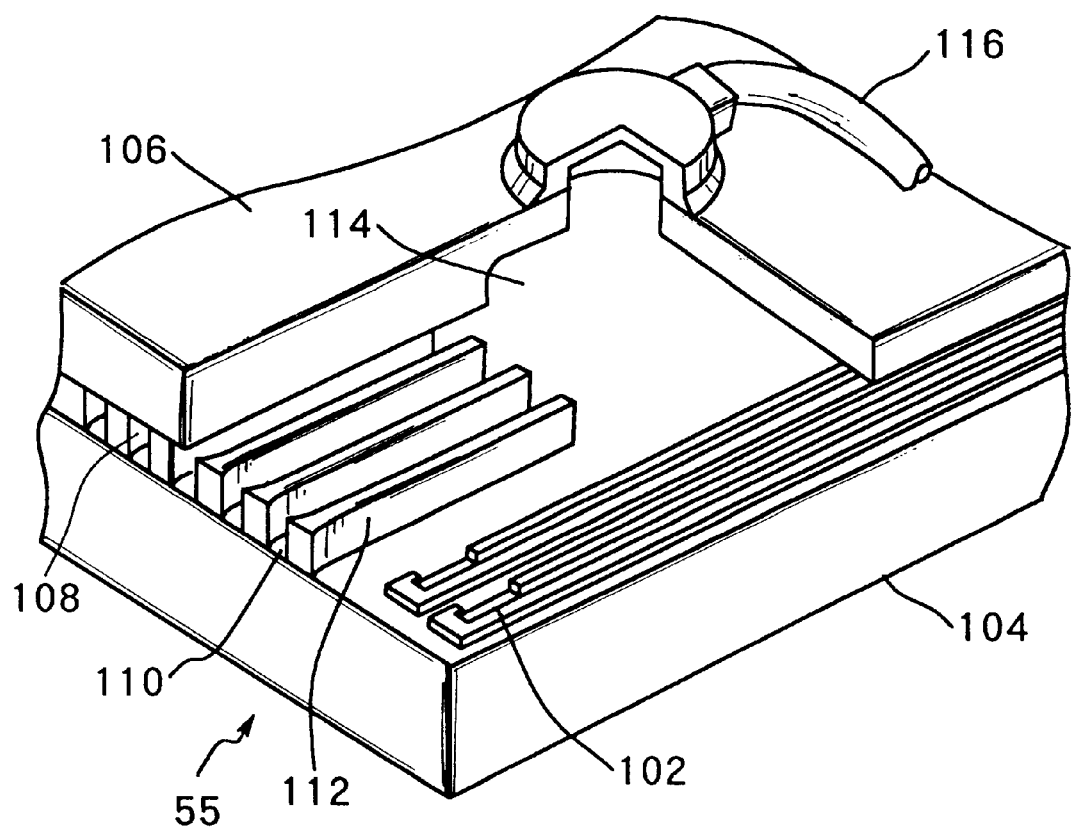
FIG. 9 is a perspective view showing the structure of an inkjet head used in the color filter coloring apparatus.

FIG. 9 is a perspective view showing the structure of one of the inkjet heads 55 used in the color filter coloring apparatus 90. As shown in FIG. 7, three inkjet heads are provided, one for each of the colors R, G, B. Since the three heads are identical structurally, FIG. 9 illustrates the structure of only one of the heads, this structure being typical.

As shown in FIG. 9, the inkjet head 55 generally comprises a heater board 104, which is a board on which a plurality of heaters 102 for heating ink are formed, and a plate 106 placed on the heater board 104. The plate 106 is formed to have a plurality of orifices 108 in back of which tunnel-shaped fluid passageways 110 communicating to the orifices 108 are formed. Each passageway 110 is isolated from its neighbors by partitioning walls 112. The fluid passageways 110 are connected to a single, common ink chamber 114 at the rear. The ink chamber 114 is supplied with ink via an ink supply tube 116 and the ink is in turn supplied from the ink chamber 114 to the passageways 110.

The heater board 104 and plate 106 are positioned to assemble the inkjet head in the state shown in FIG. 9 in such a manner that the heaters 102 will assume positions corresponding to the passageways 110. Though only two heaters 102 are shown in FIG. 9, in actuality one heater 102 is provided so as to correspond to each passageway 110.

When predetermined drive pulses are supplied to the heaters 102 with the inkjet head in the assembled state, the ink on the heaters 102 boils and forms bubbles. Owing to volumetric expansion of the bubbles, the ink is discharged by being forced out of the orifices 108. Accordingly, it is possible to regulate the size of the bubbles by controlling the drive pulses applied to the heaters 102, as by controlling the magnitude of the electrical power supplied. The volume of the ink discharged from orifices can be controlled at will.

Figure 10:
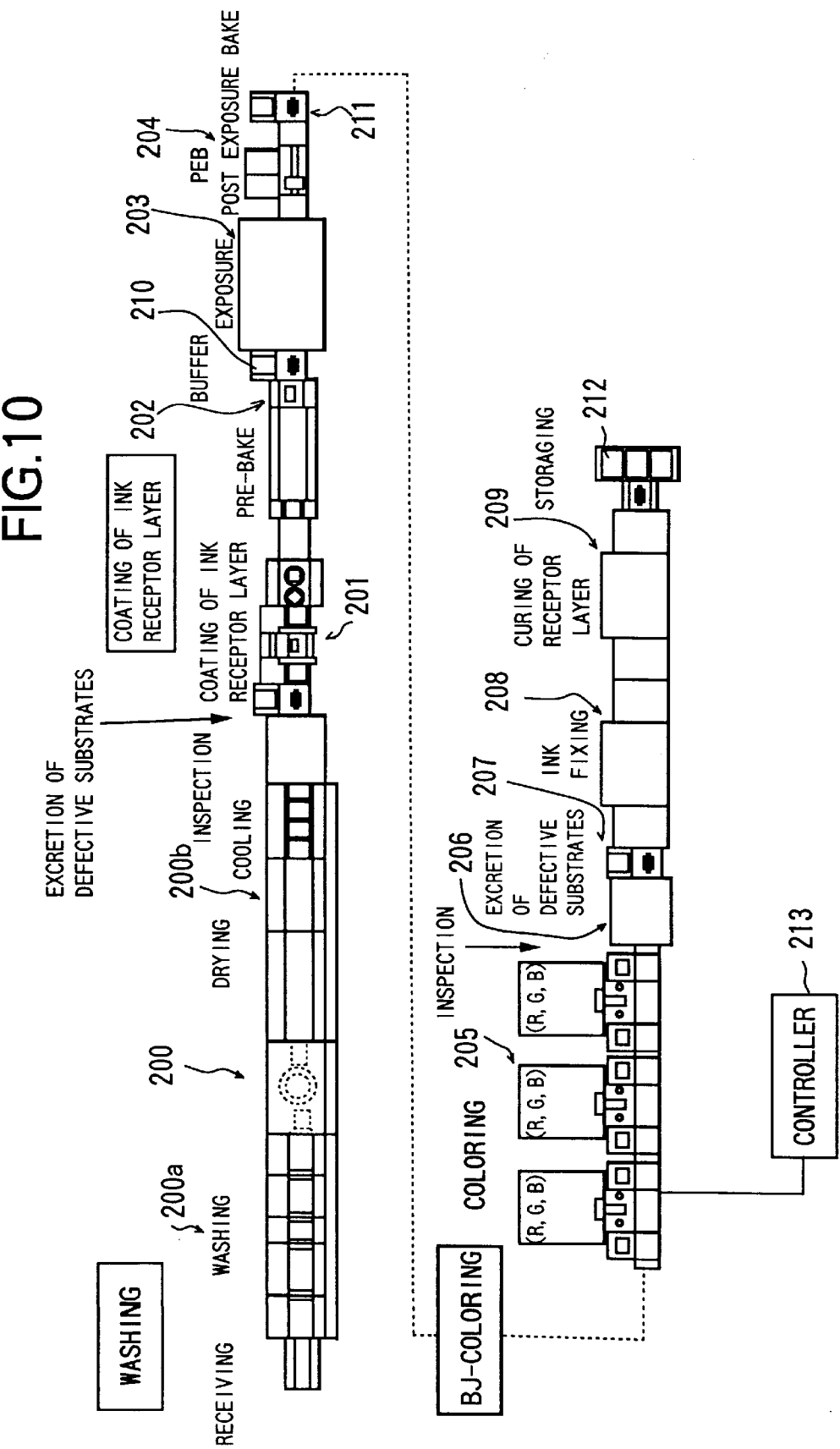
FIG. 10 is a diagram showing the arrangement of a manufacturing line for implementing a series of manufacturing steps for manufacturing the color filter shown in FIG. 1.

FIG. 10 is a diagram showing the arrangement of a manufacturing line for implementing a series of manufacturing steps for manufacturing the color filter shown in FIG. 1.

As shown in FIG. 10, a washing apparatus 200 is for washing the glass substrate 1 on which the black matrix 2 has been formed and has a washing unit 200a for washing the glass substrate 1 with a cleanser, and a drying unit 200b for drying the washed glass substrate 1. The washing operation corresponding to FIG. 1A is carried out by the washing device 200.

A coating apparatus 201 is for forming a thin, uniform layer (the ink receptor layer 3) of organic material on the glass substrate 1. A thin film is formed evenly by a spin coater, which is used generally in the art. However, the coating apparatus 201 is not limited to a spin coater; any apparatus capable of applying an organic material evenly, as by a roll coater or some other means, can be used. The organic material which forms the ink receptor layer 3 is one cured at a temperature of, say, 230° C.

A hot-plate heating apparatus 202 dries the organic material that has been applied. The heating apparatus 202 is not limited to a hot plate and can be a hot-air oven. Since mutually adjacent units are directly connected to construct a line in this embodiment, a hot-plate heating apparatus is used. The drying of the organic material (the ink receptor layer 3) is conducted at temperature lower than that at which the organic material is cured, e.g., at a temperature on the order of 50° C. The operations corresponding to FIG. 1B are performed by the coating apparatus 201 and heating apparatus 202.

An exposure apparatus 203 partially exposes the coated and dried organic material (the ink receptor layer 3) to ultraviolet radiation. The positioning of the exposure apparatus 203 is performed accurately by using a high-magnification microscope to optically detect the position of a mark that has been formed on the glass substrate 1 in advance.

A hot-plate heating apparatus 204 is for applying heating following the exposure step. The organic material that forms the ink receptor layer 3 does not, merely by being irradiated with the ultraviolet radiation, take on a property that makes it difficult to absorb ink. This hydrophobic property that makes it difficult for the layer to absorb ink is brought about by a reaction in the material that starts in response to the heating applied after the ultraviolet irradiation. The heating after ultraviolet irradiation is referred to as PEB (post-exposure baking) and is carried out at a temperature that will not cure the organic material, e.g., at a temperature on the order of 120° C. The operations corresponding to FIG. 1C are carried out by the exposure apparatus 203 and the heating apparatus 204.

Figure 11:
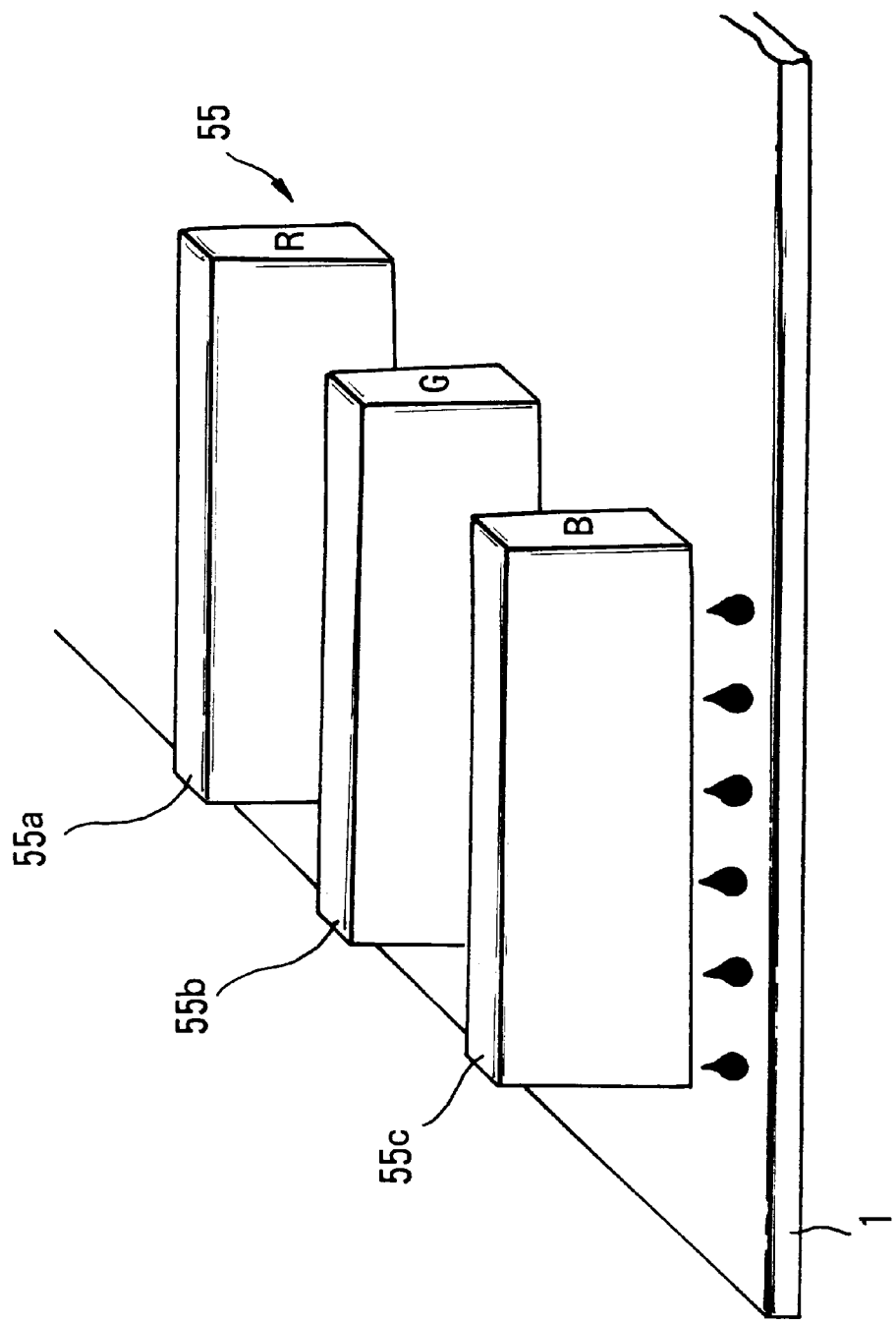
FIG. 11 is a diagram showing an inkjet head in enlarged form.

A coloring unit 205 is for partially coloring the ink receptor layer 3 by the inkjet method. The coloring process implemented by the coloring unit 205 takes the most time. In this embodiment, therefore, three coloring apparatuses are run in parallel to achieve balance with respect to the processing times required by the other processes. The coloring apparatus used here employs the color filter coloring apparatus 90 already described in connection with FIG. 7. The heads that discharge the inks in the coloring apparatus 90 are the inkjet heads 55, each of which has a multiplicity of discharge nozzles. FIG. 11 is a diagram illustrating the inkjet head 55 in enlarged form. The inkjet head 55 has three discharge heads 55a, 55b, 55c corresponding to the three colors R, G, B, respectively. An arrangement having more than three discharge heads may be used to shorten the processing time of the coloring apparatus. The color filter coloring apparatus 90 has a positioning mechanism (not shown) similar to that of the exposure apparatus 203 and can be positioned with respect to a mark formed on the glass substrate 1. The inkjet head 55 is fixed to the main body of the coloring apparatus and moves the X-Y-θ stage 52, on which the glass substrate 1 has been placed, in precise fashion. The inkjet head 55 is equipped with an ink supply mechanism (not shown). In addition, a mechanism (not shown) for recovery from clogging of discharge nozzles is operated at fixed time intervals.

An inspection apparatus 206 inspects the color glass substrate 1 for coloring flaws. An apparatus 207 rejects glass substrates found flawed by the inspection apparatus 206. The apparatus 207 has a cassette, which is for receiving defective articles, situated at the side of a conveyor on which the glass substrates 1 are conveyed. A substrate conveyance robot stands by below the conveyor. Each of the units mentioned above are interconnected by a network. For example, information resulting from the determination made by the inspection apparatus 206 is sent to the defect rejecting apparatus 207 through the network. On the basis of this information, the apparatus 207 rejects the glass substrate 1 (as a defective article) or allows it to flow to the next process (as an acceptable article). The inspection apparatus 206 is equipped with a warning device (not shown) which, when the glass substrate 1 has been judged to be defective, so informs the operator. The inspection for defects performed by the inspection apparatus 206 should be carried out after the inks have been thoroughly dispersed in the ink receptor layer 3. The reason for this is that if a defect such as whitening occurs in a state in which the inks are not thoroughly dispersed, there is the possibility that such a defect will vanish after thorough dispersion of the inks.

A drying apparatus 208 dries the ink on the colored glass substrate 1. The drying apparatus 208 has the form of an oven into which glass substrates can be introduced one at a time. Since the purpose of this drying apparatus is to dry the ink, the heating temperature is set to be lower than the curing temperature of the ink receptor layer 3, e.g., to a temperature on the order of 90° C. The operations carried out at FIG. 1D are performed by the coloring unit 205 and drying apparatus 208.

A heating apparatus 209 is for curing the ink receptor layer 3 having the colored portions. The heating apparatus 209 has the form of an oven into which glass substrates can be introduced one at a time. This is an arrangement similar to that of the drying apparatus 208. The heating apparatus 209 heats the glass substrate 1 to, say, 230° C. to completely cure the ink receptor layer 3. The operation corresponding to FIG. 1E is carried out by the heating apparatus 209. The reasons for thus curing the ink receptor layer 3 are to assure that the inks will not be washed away by a subsequent finishing washing process and to assure that the inks will not be changed in color or washed away by an organic solvent used in a process for forming a protective film.

By way of example, the heating apparatus 202 performs heating at 50° for 3 min, the heating apparatus 204 at 120° C. for 90 sec, the drying apparatus 208 at 90° C. for 10 min and the heating apparatus 209 at 230° C. for 30 min. If these heating operations are performed for periods of time in excess of those mentioned, there is the possibility that the ink receptor layer 3 will deteriorate and make it impossible to manufacture a normal color filter. However, in a case where malfunction has occurred in an apparatus used in a process that follows each of these heating processes, it is conceivable that the faulty apparatus will cease operating and leave the glass substrate 1 in the heating or drying apparatus for an extended period of time. In order to prevent deterioration of the ink receptor layer 3 in such case, buffers 210, 211 are placed immediately after the heating apparatus 202, 204 for the purpose of temporarily sidetracking the glass substrate 1 so that it will not be left in these heating apparatus for very long even if an apparatus should happen to cease operating. Further, in an instance where the target heating time has elapsed in the drying apparatus 208 and heating apparatus 209, a problem in terms of deterioration of the ink receptor layer 3 will not arise if the glass substrate 1 is received in an accommodating apparatus 212 placed after the heating apparatus 209. In this embodiment, the manufacturing line is interrupted after the position of the heating apparatus 209. However, in a situation where the line of a subsequent process continues from the heating apparatus 209, it will be necessary to provide a buffer similar to the buffers 210, 211 instead of the accommodating apparatus 212 to assure that the glass substrate 1 will not be left in the drying apparatus 208 or heating apparatus 209 for a period of time longer than that required.

The operation of the manufacturing line thus constructed will now be described.

When the glass substrate 1 on the surface of which the black matrix 2 has been formed is introduced to the line, first the surface of the substrate is washed by the washing apparatus 200. The washing apparatus 200 may be connected directly to the coating apparatus 201, as in the illustrated embodiment, or may be installed separately and transport the glass substrate 1 to the manufacturing line by a cassette. In such case a device which extracts the substrate from the cassette is placed in front of the coating apparatus 201. The black matrix 2 of the liquid crystal panel is formed on the glass substrate 1 beforehand, as illustrated in FIG. 1. The black matrix 2 is obtained by forming a thin film of metal material on the glass substrate 1 by a method such as sputtering and then patterning the film by photolithography. The black matrix 2 need not be a metal material.

The glass substrate 1 is conveyed from left to right in FIG. 10. The ink receptor layer 3 is formed by uniformly coating the glass substrate 1 with an organic material to a film thickness of 10 μm or less by means of the spin coater 201, as shown in FIG. 1B. The degree of uniformity preferably is within ±5% of the substrate thickness. The glass substrate 1 coated with the ink receptor layer 3 is sent to the hot plate 202, where the solvent contained in the organic material to facilitate its application is vaporized to effect drying. The temperature of the hot plate must be made less than the temperature at which the organic material cures, as set forth earlier.

Next, the glass substrate 1 is irradiated with ultraviolet radiation by the exposure apparatus 203. The irradiation using ultraviolet radiation is carried out selectively in conformity with the black matrix 2 already formed on the glass substrate 1. To accomplish this, positioning is performed in accurate fashion by detecting the positioning mark formed on the glass substrate 1 in advance. Positioning accuracy at this time preferably is ±2 μm or less. It is preferred that the positioning mark be formed at the same time as the black matrix 2. However, it does not matter if the positioning mark is formed at a step separate from that at which the black matrix 2 is formed so long as accuracy is maintained.

Owing to the irradiation with ultraviolet rays, a change is produced in the ink receptor layer 3 at the portions irradiated, as illustrated in FIG. 1C. The glass substrate 1 is then heated by the hot plate 204. The heating temperature at this time must be made less than the curing temperature of the ink receptor layer 3, as mentioned above. Heating the glass substrate 1 after it has been irradiated with ultraviolet radiation causes a reaction in the irradiated portions 5, thereby making the organic material hydrophobic. In other words, the change to a hydrophobic property occurs only at the portions 5 (the portions of the black matrix 2) that were selectively irradiated with ultraviolet radiation by the exposure apparatus 203.

The glass substrate 1 thus treated so that the portions at the black matrix 2 are rendered hydrophobic is conveyed to the coloring unit 205. As at the exposure apparatus 203, the coloring unit 205 effects precise positioning with respect to the reference positioning mark. In order for positioning to be carried out, the stage holding the glass substrate 1 is moved accurately in a horizontal plane by a mechanism similar to that used in the exposure apparatus 203. The glass substrate 1 is conveyed to the positioning stage by a conveyance system (described later in greater detail) so that its position may be adjusted. At the completion of positioning, the substrate is moved, along with the stage, to the position of the inkjet head 55 and the inkjet head 55 is driven in conformity with the positions of the pixels of the color filter to discharge ink toward the glass substrate 1. The positions of the pixels of the color filter are stored in the control section of the color filter coloring apparatus 90 in advance. While the X-Y-θ stage 52 is being moved, the inkjet head 55 is driven to discharge the ink toward the glass substrate 1 when the stage position information and pixel position data coincide. Immediately after the ink impacts against the glass substrate 1, the colored portions form protrusions, as shown at FIG. 1D. These protrusions gradually permeate into the organic material at the subsequent drying step, as shown at FIG. 1E, and become the pixels of the color filter. Since the glass substrate 1 was made hydrophobic at the positions of the black matrix 2 by previous treatment, the ink does not permeate these portions and, hence, only the portions corresponding to the pixels are colored.

The glass substrate 1 discharged from the coloring unit 205 is inspected by the inspection apparatus 206. Here it is determined whether ink has been discharged onto each pixel. If a pixel that has not been colored is detected, the inspection apparatus judges that this substrate is faulty and sends it to the defect rejecting apparatus 207. Here the operator is warned that the substrate is defective. The defect rejecting apparatus 207 places the defective glass substrate in a cassette by means of the robot but allows an acceptable substrate to be conveyed to the next process. The solvent component of the ink is vaporized and the ink is made to permeate the ink receptor layer 3 by the heating apparatus 208. The temperature at this time must be made less than the curing temperature of the ink receptor layer 3, as mentioned earlier. Next, the glass substrate 1 is sent to the heating apparatus 209, where the ink receptor layer 3 is cured. Curing the ink receptor layer 3 fixes the ink to the glass substrate 1.

The time it takes to move the glass substrate 1 from one process to the next must be set in the following manner:

First, the time needed to move the substrate from the coating apparatus 201 to the exposure apparatus 203 must be set to be less than the time in which the ink receptor layer 3 is capable of reacting to exposure. Setting this time will make it possible for exposure to be performed before the reaction of the overall ink receptor layer 3 proceeds, thus allowing the portions that do and do not readily absorb the ink to be clearly defined. If the natural reaction of the ink receptor layer 3 proceeds too far, the reaction in the unexposed portions that are intended to absorb ink also proceeds, rendering these portions hydrophobic so that it is difficult for them to absorb ink.

The time needed to move the substrate from the exposure apparatus 203 to the coloring unit 205 must be set to be less than the time needed to maintain a state in which the ink absorbing portions 6 absorb ink and the ink is capable of being dispersed following exposure. When this time elapses, the reaction of the ink receptor layer 3 proceeds, even at room temperature, to such an extent that the portions intended to absorb ink will not be able to absorb ink easily.

The time needed to move the substrate from the coloring unit 205 to the drying apparatus 208 must be set to be greater than the time needed for the ink to disperse into the ink absorbing portions 6 after coloration. This assures enough time for thorough dispersion of the ink and makes it possible to prevent the whitening of pixels.

The time needed to move the substrate from the drying apparatus 208 to the heating apparatus 209 must be set to be less than the time it takes for the ink to deteriorate after drying. If this is done, the ink will not become discolored due to a chemical reaction. Further, as time passes, solvent that could not be vaporized by the drying apparatus 208 (solvent which essentially is to be dried out by the heating apparatus 209) evaporates naturally. When this occurs, drying proceeds differently, depending upon the particular portion, and the amount of solvent remaining differs locally. As a result, when the solvent evaporates in the curing process, there are instances where the film thickness becomes locally uneven owing to the disparity in the amount of solvent left. When the substrate is subsequently superimposed on the liquid crystal panel, gaps may be produced. This problem can be avoided by setting the time for movement from the drying apparatus 208 to the heating apparatus 209 in the manner described above.

It should be noted that the times between processes set in the manner mentioned above are established upon taking into account the size of the glass substrate 1 and the time required for each process, namely manufacture time (e.g., one minute) per substrate.

Figure 12:
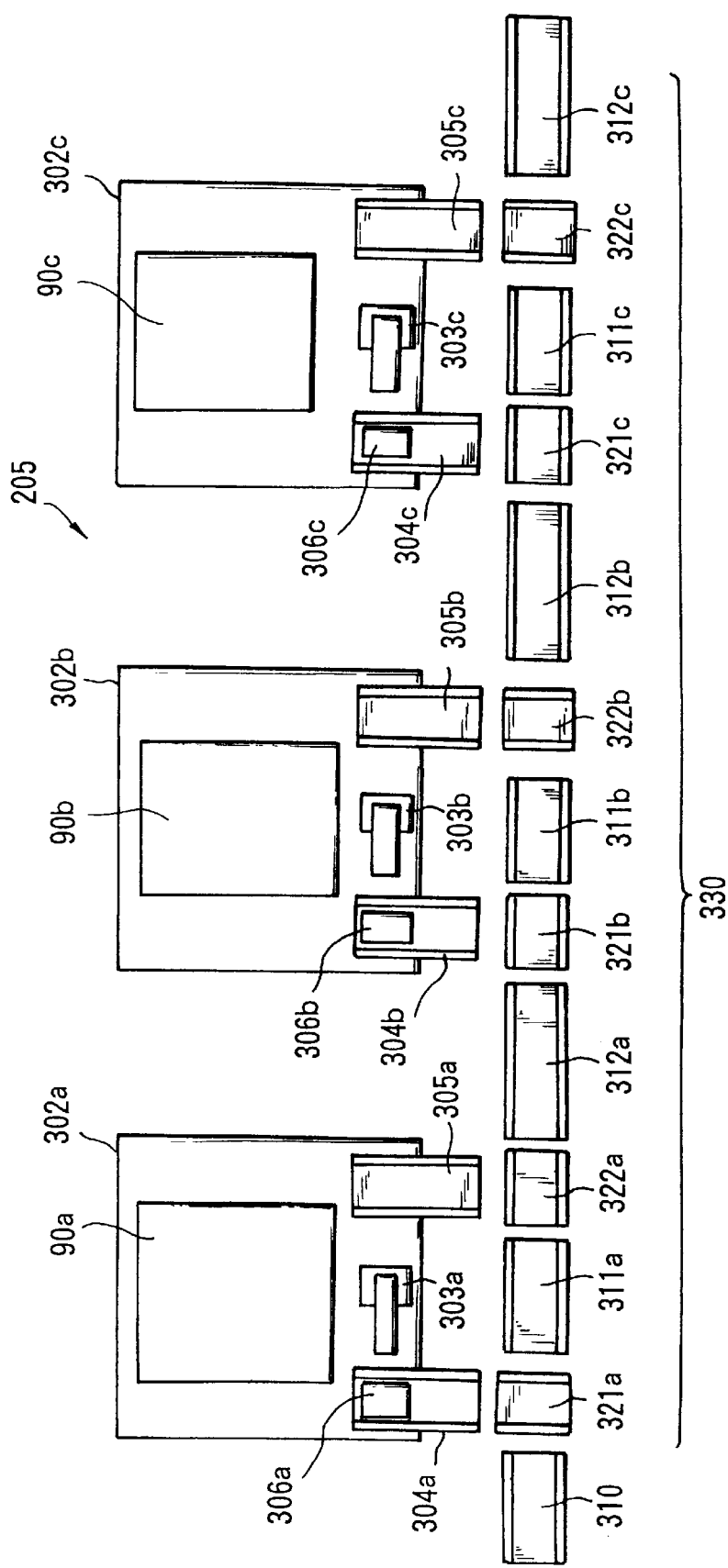
FIG. 12 is diagram showing the arrangement of the coloring unit in enlarged form.
Figure 13:
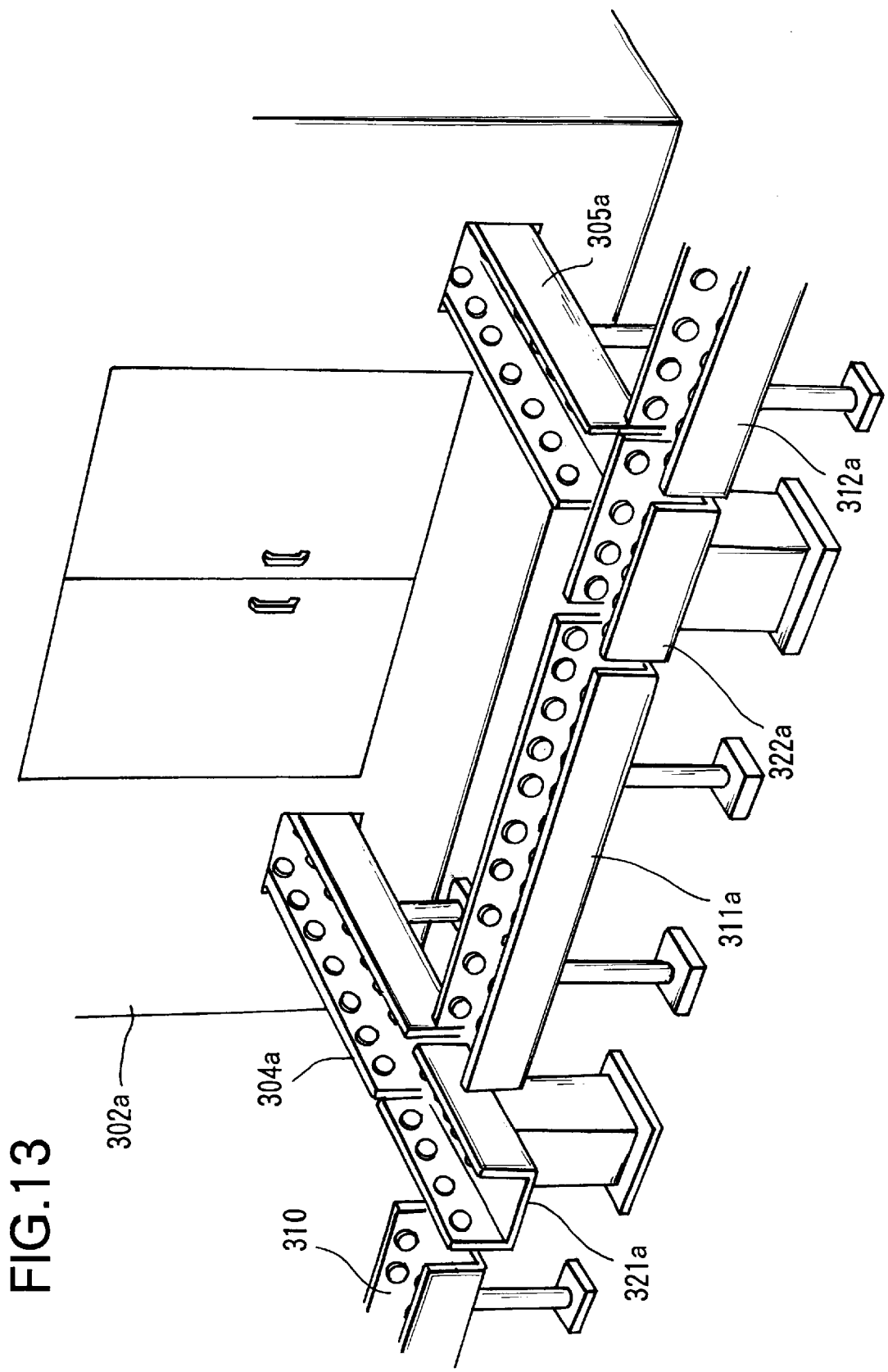
FIG. 13 is diagram showing the arrangement of the coloring unit in enlarged form.

FIGS. 12 and 13 are diagrams showing the construction of the coloring unit 205 in enlarged form.

As set forth above, three of the coloring apparatuses 90 are installed and run in parallel to achieve balance with respect to the processing times required by the other processes. FIG. 12 illustrates an arrangement for distributing the glass substrates to the three coloring apparatuses 90.

In FIGS. 12 and 13, reference characters 90a, 90b and 90c denote the coloring apparatuses described in connection with FIG. 7, 302a, 302b, 302c represent isothermal chambers for holding the ambient temperature of the respective coloring apparatus constant, and 330 a main conveyance system for conveying a workpiece from one process to the next. The isothermal chambers 302a, 302b, 302c are so adapted that the internal temperatures can be controlled to ±1° C. of the target temperature. The main conveyance system 330 has swiveling conveyors 321a, 321b, 321c, 322a, 322b, 322c that swivel in a horizontal plane. The swiveling conveyors 321a, 321b, 321c supply the glass substrate 1 to the coloring apparatus 90a, 90b, 90c. For example, the swiveling conveyor 321b is standing by in an orientation for conveying the glass substrate 1 from the preceding process to the following process. The swiveling conveyor 321a is in a position for conveying the glass substrate 1 to the coloring apparatus 90a. These swiveling conveyors are capable of being swiveled to these two positions. The swiveling conveyors 322a, 322b, 322c are for returning glass substrates 1, which have been discharged from the coloring apparatus 90a, 90b, 90c, respectively, to the main conveyance system. These swiveling conveyors are capable of being swiveled to two positions in the same manner as the swiveling conveyor 321a. Reference characters 311a, 311b, 311c, 312a, 312b, 312c represent advancing conveyors interconnecting the swiveling conveyors.

Supply conveyors 304a, 304b, 304c supply the glass substrates to the respective coloring apparatus, and conveyors 305a, 305b, 305c return the colored glass substrates, which have been colored by the respective coloring apparatus, to the main conveyance system 330. Glass substrate standby positions 306a, 306b, 306c are provided at the respective supply conveyors. Robots 303a, 303b, 303c supply the glass substrates from the respective standby positions to the respective coloring apparatus 90a, 90b, 90c, the distal end of each robot having a hand that attracts the glass substrate 1 by suction. Though the robots used in this embodiment operate in a cylindrical coordinate system, other types of robots may be used. A glass substrate standby position 310 is provided in the main conveyance system 330.

The isothermal chambers 302a, 302b, 302c of the coloring apparatuses 90a, 90b, 90c are situated away from the main conveyance system 330. This is to allow the operator to work in the space between the main conveyance system 330 and the isothermal chambers 302a, 302b, 302c when, for example, any of the robots 303a, 303b, 303c malfunctions.

The operation of the apparatus construction as set forth above will now be described. The operation is controlled by a control unit 213 connected to the apparatus.

Figure 14:
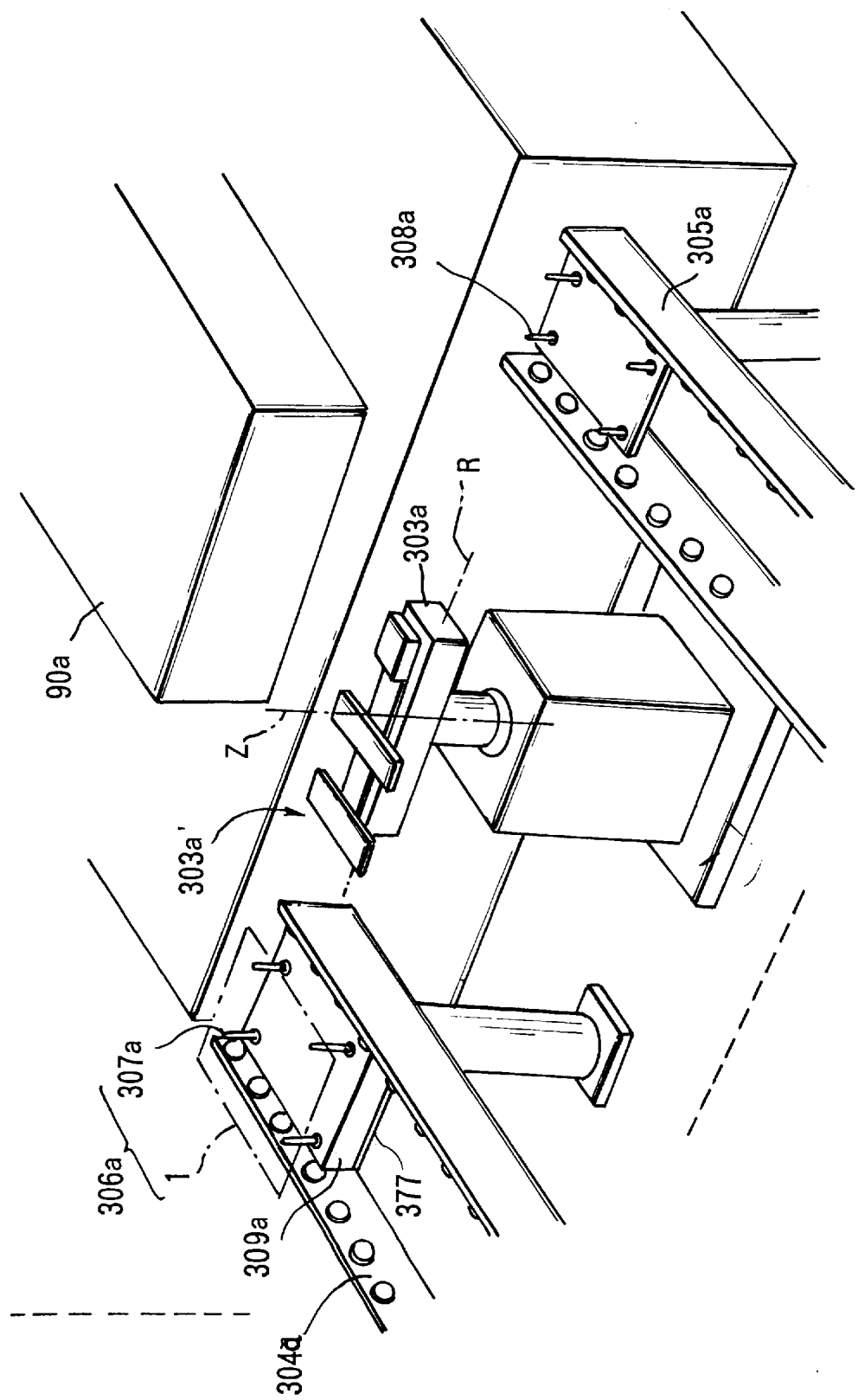
FIG. 14 is a diagram showing the arrangement of components in the vicinity of a coloring apparatus.

The coloring apparatus described will be apparatus 90a in FIG. 12. The next glass substrate is prepared at the standby position 306a. When work is finished under these conditions, the robot 303a extracts the colored glass substrate from the coloring apparatus 90a and places it on the discharge conveyor 305a. As shown in FIG. 14, lifting pins 308a are disposed on the discharge conveyor 305a. When the robot 303a places the glass substrate 1 on the discharge conveyor 305a, the pins are raised and wait in standby. The spacing between the lifting pins 308a in the direction in which the robot penetrates is set to be greater than the width of a hand 303a' of the robot 303a. Upon receiving the colored glass substrate 1 from the coloring apparatus 90a, the robot 303a is withdrawn along its linear axis (R axis) in a horizontal plane and then the hand 303a' is swiveled clockwise amount the vertical axis (Z axis). Next, the robot is advanced along the R axis to bring the colored glass substrate 1 to a point above the discharge conveyor 305a. The hand 303a' is then lowered along the vertical (Z) axis to place the colored glass substrate 1 on the lifting pins 308a. The hand 303a' is lowered slightly even after the substrate has been placed upon the lifting pins 308a and is then withdrawn along the R axis. Subsequently, the hand 303a' is swiveled counterclockwise for 180° and is advanced along the R axis. At this time the glass substrate 1 at the standby position is lifted up from the conveyor 304a by lifting pins 307a. The hand 303a penetrates between the lifting pins 307a in the same manner as that at the time of substrate discharge. Next, the robot is raised along the Z axis so that the glass substrate 1 is accepted by the hand 303a'. After the glass substrate 1 has become affixed to the hand 303a by suction, the robot is withdrawn along the R axis. The hand 303a' is then swiveled 90° in the clockwise direction about the Z axis and the robot is advanced along the R axis to supply the glass substrate 1 to the coloring apparatus 90a.

When the glass substrate 1 is placed upon the lifting pins 308a of the discharge conveyor 305a and the hand 303a' is retracted, the lifting pins 308a are lowered to transfer the glass substrate 1 to the discharge conveyor 305a. The glass substrate 1 transferred to the discharge conveyor 305a is returned to the main conveyance system 330 via the swiveling conveyor 322a. A sensor (not shown) for sensing the glass substrate is provided in the main conveyance system 330. On the basis of a signal from the sensor, the control unit 213 is capable of ascertaining where the glass substrate 1 is currently located. At such time information indicating that the glass substrate 1 received from the discharge conveyor 305a has been colored is written in the control unit 213. As a result, the fact that the glass substrate currently on the swiveling conveyor 322a has been colored can be recognized by the control system and this information is successively handed over to the next conveyance system as the glass substrate is conveyed. When the colored glass substrate arrives at the swiveling conveyor 321b, therefore, the glass substrate is advanced directly to the ensuing processes without being taken over by the coloring apparatus 90b. Further, when a glass substrate not yet colored arrives at the swiveling conveyor 321b, the glass substrate is taken over by the coloring apparatus 90b. This means that even though glass substrates not yet colored and glass substrates whose coloring has been completed flow in mixed form, the swiveling conveyors 321a, 321b, 321c are capable of operating normally.

Consequently, when glass substrates 1 are delivered to the robots 303a, 303b, 303c from the standby positions 306a, 306b, 306c, signal processing for conveying the glass substrate 1 at the main standby position 310 to the standby positions 306a, 306b, 306c is executed immediately by the control unit 213. At this time the control unit 213 acquires information indicating to which coloring apparatus the glass substrate 1 at the standby position 310 is to be conveyed. Since information is transferred as the glass substrates 1 are conveyed, the swiveling conveyors 321a, 321b, 321c of the main conveyance system 330 are controlled so as to convey the glass substrates 1 to any of the standby positions 306a, 306b, 306c. In other words, operation can proceed normally even though glass substrates not yet colored and glass substrates whose coloring has been completed flow in mixed form on the main conveyance system 330. Therefore, if glass substrates 1 are no longer present at the standby positions 306a, 306b, 306, the next glass substrate 1 can be conveyed to the standby positions 306a, 306b, 306c indifferent to the fact that glass substrates are being conveyed on the main conveyance system 330.

FIGS. 15 through 20 are diagrams illustrating connections from the heating apparatus 204 to the coloring unit 205.

Figure 15:
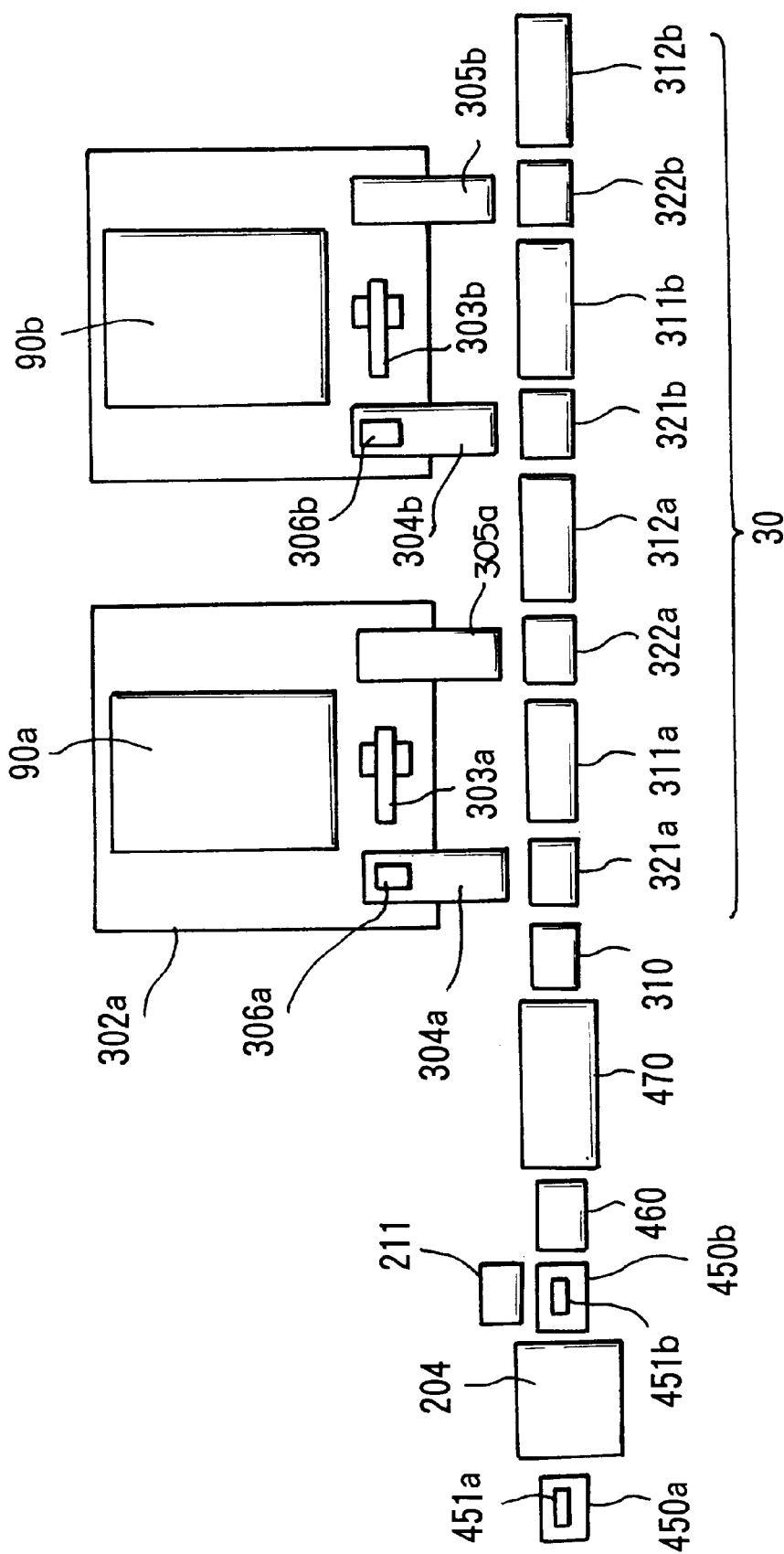
FIG. 15 is a diagram showing the arrangement of connections from the heating apparatus to the coloring unit.
Figure 18:
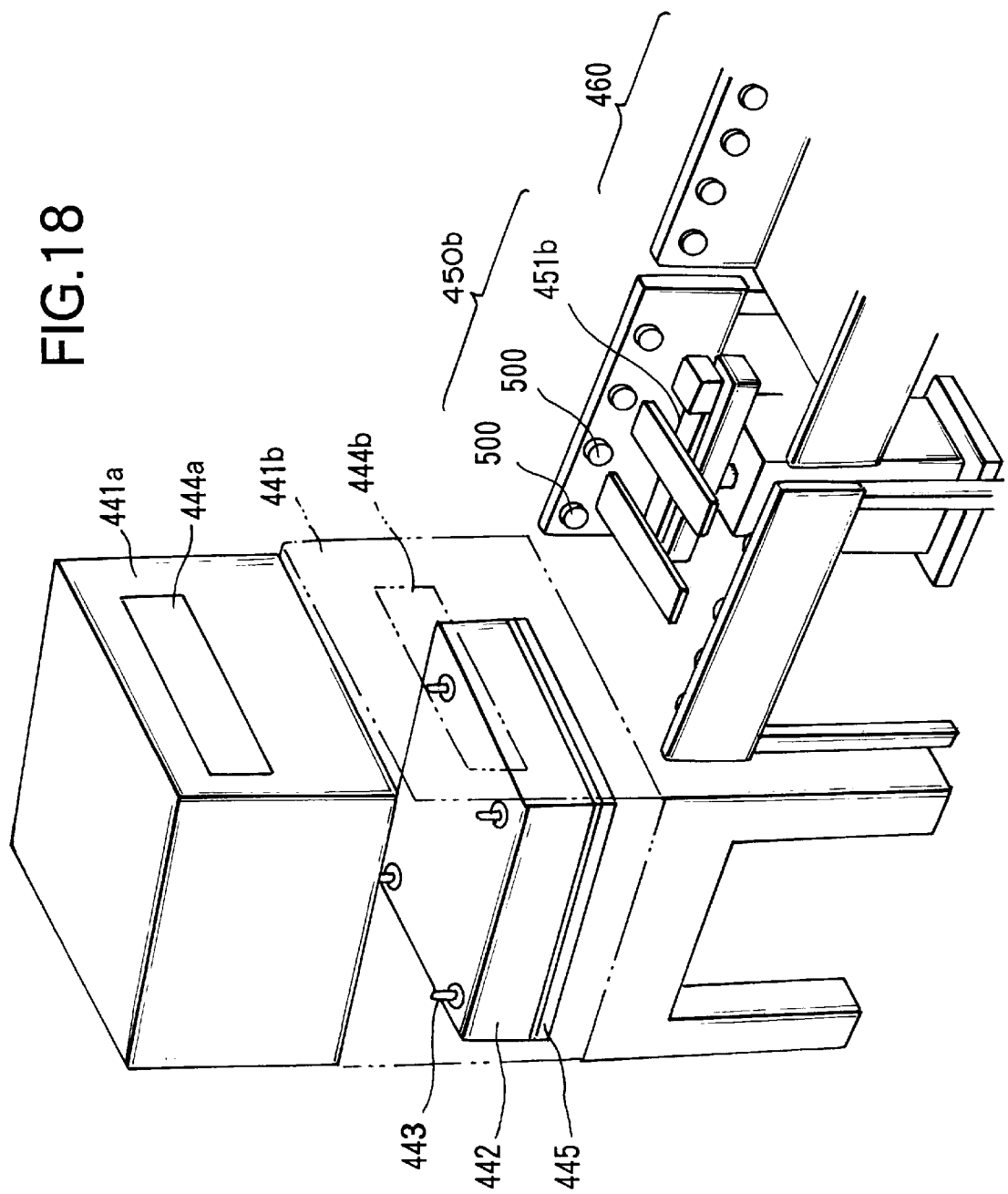
FIG. 18 is a diagram showing the arrangement of connections from the heating apparatus to the coloring unit.
Figure 19:
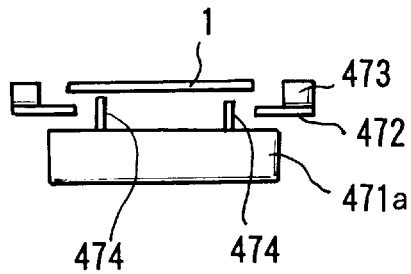
FIG. 19 is a diagram showing the arrangement of connections from the heating apparatus to the coloring unit.

The heating apparatus 204 illustrated in FIGS. 10 and 15 includes vertically stacked housings 441a, 441b each of which contains a hot plate 442, as illustrated in FIG. 18. The reason for this is that since heating time is longer than the tact (processing time per glass substrate) of the production line. By providing two hot plates, a decline in line tact can be avoided. Further, line tact in this embodiment is 60 sec and heating time is 90 sec. Since defects will occur if heating is performed for longer than 90 sec, the glass substrate must be discharged from the heating apparatus 204 in 90 sec. Accordingly, with hot plates arranged horizontally and conveyance performed by successive rod feed, balance with line tact cannot be achieved. Accordingly, robots are provided before and after and driven individually. Lifting pins 443 for lifting the glass substrate 1 pass through the hot plate 442 and are secured to a plate 445 at their lower ends. The plate 445 is coupled to a drive source (not shown) and can be moved up and down. The lifting pins 443 moved in association with the plate 445. When the plate 445 is at its lowermost position, the lifting pins 443 assume a position below the upper surface of the hot plate 442. When the plate 445 is elevated, the lifting pins 443 rise to a height that allows the hand of a robot 451b to be inserted between the glass substrate 1 and the hot plate 42. The housings 441a, 441b are formed to have openings 444a, 444b, respectively, which allow the robot hand to penetrate into the interior of the housing. Openings are formed also in the opposite sides of the housings in FIG. 18. As a result, robot hands can penetrate from both sides of the housing.

Figure 16:
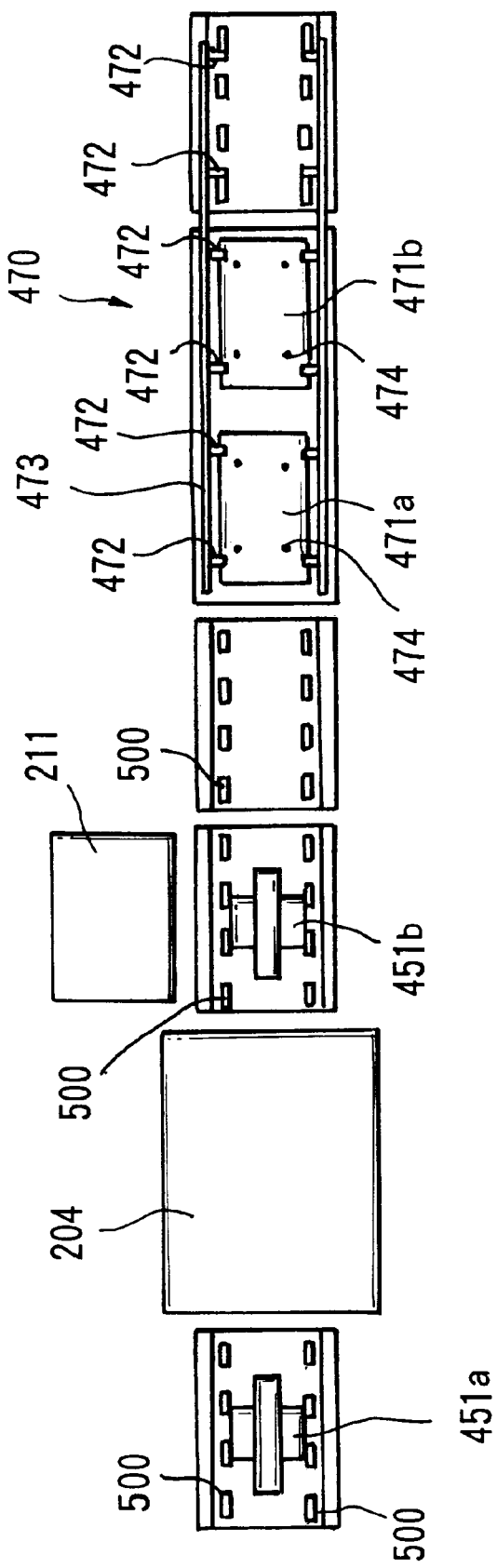
FIG. 16 is a diagram showing the arrangement of connections from the heating apparatus to the coloring unit.
Figure 17:
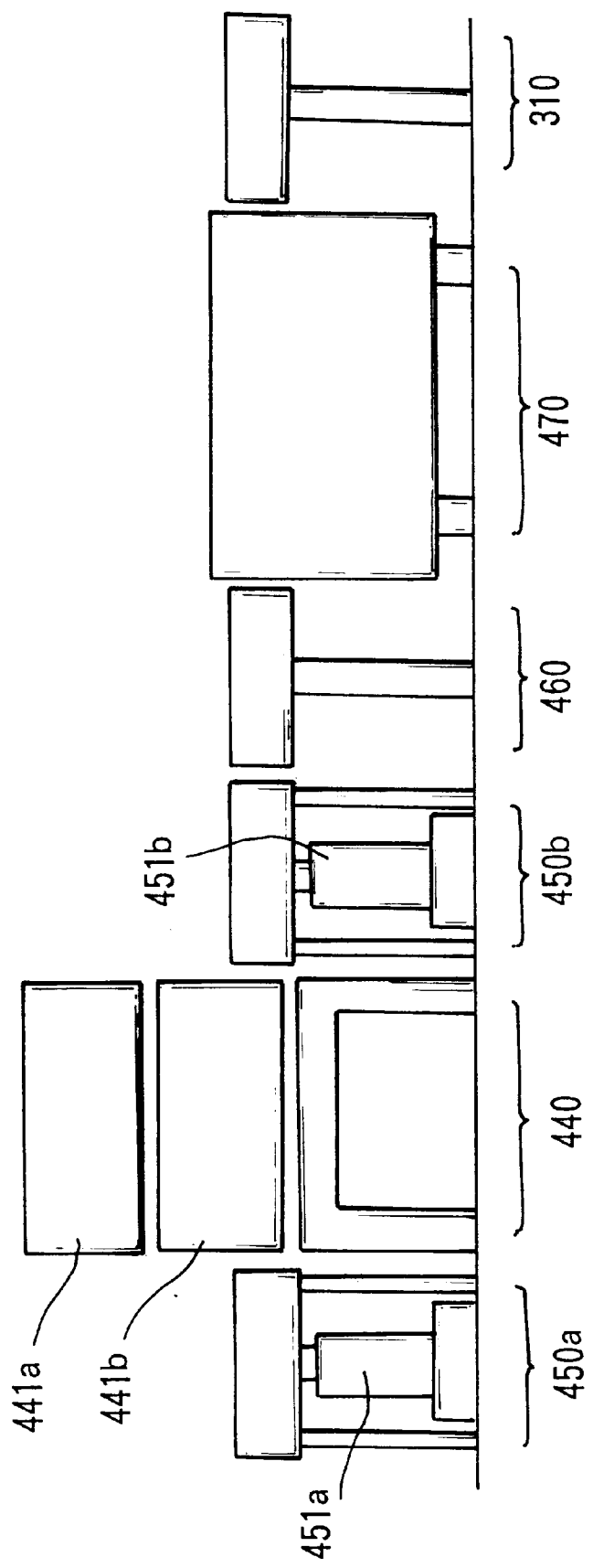
FIG. 17 is a diagram showing the arrangement of connections from the heating apparatus to the coloring unit.

Apparatus 450a, 450b supply the glass substrate 1 to the heating apparatus 204 and have robots 451a, 451b, respectively, of the kind that operate in cylindrical coordinate systems. A cooling apparatus 470 has cold plates 471a, 471b. A conveyor 460 connects the heating apparatus 204 and the cooling apparatus 470. As shown in FIG. 16, the cooling apparatus 470 is equipped with shuttle bars 473 for conveying glass substrates, conveyance fingers attached to the shuttle bars 473, and lifting pins 474 for lifting the glass substrate. The cold plates 471a, 471b are provided with piping (not shown) capable of circulating water the temperature whereof is controlled to ±2° C.

An isothermal device provided at the substrate standby position 306a of the coloring apparatus is for the purpose of controlling the temperature of the glass substrate 1, which has been cooled by the cold plates 471a, 471b, to a precision the same as that of the controlled temperature in the isothermal chamber 302a. If the glass substrate stretches or contracts owing to a change in temperature in the process for coloring the color filter, there is a decline in the precision with which the ink from the inkjet head impacts upon the substrate. Since it is required that the impact precision be such that any deviation in impact is held to less than several microns, management of the temperature of the glass substrate must be on the order of ±1° C. Accordingly, the temperature precision (±2° C.) of cooling performed at the cooling apparatus 470 is unsatisfactory. It is required that the temperature precision of the glass substrate 1 be set to ±1° C., which is the same as that of the managed temperature of the isothermal chambers 302a, 302b, 302c. The isothermal device functions make the temperature precision of the glass substrate 1 conform to the temperature precision of the isothermal chambers.

Figure 20A:
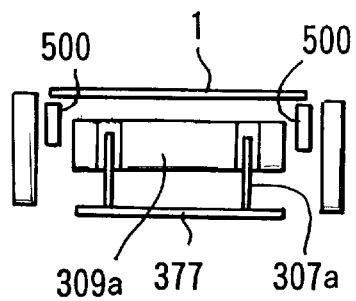
FIGS. 20A through 20C are diagrams showing the arrangement of connections from the heating apparatus to the coloring unit.
Figure 20B:
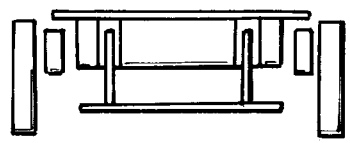
Figure 20C:
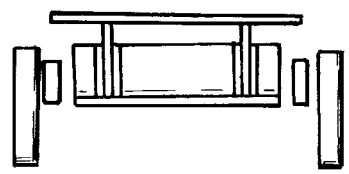

The isothermal device is made of metal (such as aluminum) and includes a cold plate 309a, which exhibits a large thermal capacity, penetrated by lifting pins 307a that lift the glass substrate 1. As shown in FIG. 20, the lifting pins 307a are fixed to a plate 377, which is connected to a drive system (not shown) and can be moved up and down in the vertical direction. The cold plate 309a also is connected to a drive system (not shown) and can be moved up and down in the vertical direction. The plate 309a and lifting pins 307a can be driven separately.

Conveyance rollers 500 are rotatably attached to side plates of each conveyor. The rollers 500 are driven by a driving source (not shown) and are capable of conveying the glass substrates 1.

The color filter coloring apparatus 90a, 90b, 90c rely upon the inkjet method and must color the color filters for liquid crystal cells in a highly accurate manner. For this reason, any variance in the temperature of the glass substrates can result in difficulties, namely a change in the lengths of the substrates per se. In the case of a glass substrate for a liquid crystal cell, a temperature difference of 1° C. can cause a 360×465-mm substrate to experience a change in overall length of 2.3 $\mu$m longitudinally. Accordingly, it is required that the substrate also have its temperature controlled in precise fashion by the isothermal chamber.

The operation of the apparatus constructed as set forth above will now be described.

The glass substrate 1 conveyed in from the previous process is placed inside either the housing 441a or 441b of heating apparatus 204 by the robot 451a. When the substrate has been heated by the heating apparatus 204 the prescribed length of time, the substrate is extracted from the heating apparatus 204 by the robot 451b. Upon being extracted, the substrate 1 is sent to the next conveyor 460 in sync with the line tact. When the substrate arrives at the conveyor 460, the shuttle bar 473 of the cooling apparatus 470 is advanced toward the conveyor 460. After the shuttle bars 473 are made to approach each other by being moved toward the center line of the conveyor, the shuttle bars are raised. When this is done, the conveyance fingers 472 support the glass substrate 1 and lift it from the conveyor 460. After the substrate is raised, the shuttle bars 473 are moved to the next process and then lowered. At this time the lifting pins 474 of the cold plate 471a are in the raised attitude and the glass substrate 1 is delivered to these pins. This is followed by separating the shuttle bars 473, i.e., by moving the shuttle bars away from each other to the left and right. The lifting pins 474 are then lowered to place the glass substrate 1 on the cold table 471a. The latter is provided with a multiplicity of 2-mm suction holes which secure the substrate by suction. The substrate is cooled by the cold plate 471a, through which a coolant is circulated. In accordance with the time of the line tact, the lifting pins 474 are raised to lift the glass substrate 1 from the cold plate 471a. The shuttle bars 473 are moved toward the preceding stage under these conditions. The shuttle bars 473 operate in the same manner as described earlier to place the glass substrate 1 on the conveyance fingers 472 and send it to the cold plate 471b. The glass substrate 1 is thus cooled down substantially to room temperature and is then made to stand by at the standby position 310. When a conveyance request is issued from each coloring apparatus, glass substrates are conveyed to the standby positions 306a, 306b at the plates 309a, 309b of the isothermal devices of each apparatus.

By way of example, when a glass substrate 1 arrives at each standby position 306a [(a) in FIG. 20], the plate 309a and lifting pins 307a are raised simultaneously to place the glass substrate 1 on the plate 309a. The plate 309a is provided with 2-mm suction holes (not shown) that hold the substrate fast. Upon elapse of a predetermined period of time, the lifting pins 307a are raised to lift the glass substrate 1 from the plate 309a. Under these conditions the hand of the robot 303a is inserted between the lifting pins 307a and is then raised to transfer the substrate. The plate 309a is a member exhibiting good thermal conduction and is made of aluminum in this embodiment. Since the glass substrate 1 has been cooled down to substantially room temperature by the cold plates 471a, 471b of the cooling apparatus 470 at the immediately preceding step, the flow of heat from the glass substrate 1 to the plate 309a is slight. As a consequence, by the time the next glass substrate arrives, the temperature of the glass substrate 1 will have been rendered constant with a considerable degree of accuracy owing to the environment of the isothermal chamber 302a. It should be noted that the upper portion of each of the isothermal chambers 302a, 302b, 302c is provided with a blower for blowing in constant-temperature clean air. By blowing down this constant-temperature clean air, the temperature of the glass substrate 1 can be stabilized.

In accordance with this embodiment, as described above, a series of steps for manufacturing a color filter are executed one after another in the form of a line. This makes it possible to improve the efficiency of the operation and to raise productivity.

It should be noted that the embodiment described above may be modified within the scope of the claims and that the invention is applicable to such an embodiment.

By way of example, the foregoing description relates to an in-line arrangement constructed by connecting the apparatus of each manufacturing step. However, the system may be constructed of individual apparatus and the glass substrates maybe conveyed by individual cassettes. Further, part of the system may be connected in an in-line arrangement and part may be constituted by individual apparatus.

Further, an arrangement may be adopted in which coloring in one color is performed by one coloring apparatus, in which case the number of coloring apparatus would be equal to the number of colors applied.

Furthermore, in this embodiment, the liquid crystal device is so constructed that the black matrix is provided on the side of the color filter. However, the display device may be one not having a black matrix. In such case reference marks for positioning would be provided separately.

The present invention has been described in regard to a printing apparatus of the inkjet recording type, particularly one having means (e.g., an electrothermal transducer or laser beam) for generating thermal energy as the energy utilized to discharge ink, wherein a change in the state of the ink is brought about by this thermal energy. In accordance with this method of printing, high-density, high-definition printing can be achieved.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with printing information, to an electrothermal transducer arranged to correspond to a sheet or fluid passageway holding a fluid (ink). As a result, thermal energy is produced in the electrothermal transducer to bring about film boiling on the thermal working surface of the inkjet head. Accordingly, air bubbles can be formed in the fluid (ink) in one-to-one correspondence with the drive signals. Owing to growth and contraction of the air bubbles, the fluid (ink) is jetted via an orifice so as to form at least one droplet. If the drive signal has the form of a pulse, growth and contraction of the air bubbles can be made to take place rapidly and in appropriate fashion. This is preferred since it will be possible to achieve fluid (ink) discharge exhibiting excellent response.

Signals described in the specifications of U.S. Pat. Nos. 4,463,359 and 4,345,262 are suitable as drive pulses having this pulse shape. It should be noted that even better recording can be performed by employing the conditions described in the specification of U.S. Pat. No. 4,313,124, which discloses an invention relating to the rate of increase in the temperature of the above-mentioned thermal working surface.

In addition to the combination of the orifice, fluid passageway and electrothermal transducer (in which the fluid passageway is linear or right-angled) disclosed as the construction of the printing head in each of the above-mentioned specifications, an arrangement using the art described in the specifications of U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink discharge portions of a plurality of electrothermal transducers, or Japanese Patent Application Laid-Open No. 59-138461, which discloses a configuration having openings made to correspond to the ink discharge portions, wherein the openings absorb pressure waves of thermal energy.

As a printing head of the full-line type having a length corresponding to the maximum width of the recording medium capable of being printed on by the printing apparatus, use can be made of an arrangement in which the length is satisfied by a combination of plural printing heads of the kind disclosed in the foregoing specifications, or an arrangement in which printing heads serve as a single integrally formed printing head.

The printing head may be of the replaceable tip-type, in which the connection to the apparatus and the supply of ink from the apparatus can be achieved by mounting the head on the apparatus, or of the cartridge type, in which the head itself is integrally provided with an ink tank.

In order to achieve the effects of the invention more stably, the printing apparatus is additionally provided with printing head recovery means and auxiliary means. Specific examples are head capping means, cleaning means, pressurizing or suction means, preheating means comprising an electrothermal transducer, a heating element separate from this transducer or a combination of the transducer and the heating element, and a pre-discharge mode for performing a discharge of ink separate from a discharge for printing. These expedients are effective in achieving stable printing.

Further, the foregoing embodiment has been described on the assumption that ink is the fluid. The ink used may be one which solidifies at room temperature or lower, one which softens at room temperature or one which is a liquid at room temperature. It will suffice to use an ink liquefied when the printing signal is applied.

In order to positively prevent elevated temperature due to thermal energy by using this as the energy for converting the ink from the solid state to the liquid state, or in order to prevent evaporation of the ink, it is permissible to use an ink which solidifies when left standing but which is liquefied by application of heat. In any case, ink which is liquefied for the first time by thermal energy, such as an ink liquefied by application of thermal energy conforming to a printing signal and jetted as a liquid ink, or ink which has already begun to solidify at the moment it reaches the recording medium, can be applied to the present invention. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

In accordance with the present invention, as described above, a series of steps for manufacturing a color filter are executed one after another in the form of a line. This makes it possible to improve the efficiency of the operation and raise productivity.

As many apparently widely different embodiments of the present invention can be made without departing from the spirit and scope thereof, it is to be understood that the invention is not limited to the specific embodiments thereof except as defined in the appended claims.

What is claimed is:

1. A method of manufacturing a color filter by coloring a color filter substrate, comprising:

a partitioning step of partitioning the substrate into portions to be colored and portions that are not to be colored;

a coloring step of coloring the portions to be colored by discharging ink onto these portions from an ink-jet printing head;

an inspection step of inspecting said substrate for coloring flaws;

a drying step of drying the ink discharged at said coloring step; and a curing step of curing the portions which have been colored;

said partitioning step, said coloring step, said inspection step, said drying step and said curing step being performed successively in a single manufacturing line, wherein when said inspection step determines that a substrate has coloring flaws, said subsequent drying step and curing step are not performed on the substrate having coloring flaws, and such substrate is disposed as an inferior good, and wherein a time required for the substrate to proceed from said coloring step to said drying step is set to a time required for the ink to disperse in the portions to be colored, and a time required for the substrate to proceed from said drying step to said curing step is set to a time during which there will be substantially no change in the properties of the ink after drying.

2. The method according to claim 1, further comprising a forming step, which precedes said partitioning step, of forming an ink receptor layer on the substrate, said ink receptor layer comprising a material which absorbs ink;

said partitioning step including partially exposing said ink receptor layer by irradiating said layer with light, wherein said portions to be colored are formed as portions that absorb ink relatively easily, and said portions that are not to be colored are formed as portions exhibiting little absorption with respect to ink.

3. The method according to claim 2, wherein said forming step includes coating said substrate with a liquid organic material that is to form said ink receptor layer, and said method further comprises a heating step, interposed between said forming step and said partitioning step, of drying said organic material at a temperature lower than a curing temperature of said organic material.

4. The method according to claim 3, wherein when an abnormality has developed in a unit used in a step after said heating step, said substrate is buffered in a buffer, which accommodates said substrate temporarily, after said heating step is carried out for a period of time.

5. The method according to claim 3, wherein when an abnormality has developed in an apparatus used in a step after said heating step, said substrate is buffered in a buffer, which accommodates said substrate temporarily, after said heating step is carried out for a period of time.

6. The method according to claim 2, wherein said partitioning step includes:
an exposure step of partially exposing said ink receptor layer; and
a heating step, which follows said exposure step, for heating said ink receptor layer at a temperature lower than a curing temperature of said ink receptor layer.

7. The method according to claim 2, wherein, in said curing step, at least said portions of said ink receptor layer that have been colored are cured; and
wherein said curing is performed by heating said ink receptor layer at a temperature higher than a curing temperature of said ink receptor layer.

8. The method according to claim 7, wherein when an abnormality has developed in an apparatus used in a step after said heating step, said substrate is buffered in a buffer, which accommodates said substrate temporarily, after said heating step is carried out for a period of time.

9. The method according to claim 2, wherein said forming step includes controlling thickness of said ink receptor layer to a value of 10 μm or less.

10. The method according to claim 2, wherein an interval of time required between said steps is determined based upon size of said substrate and time required for each step.

11. The method according to claim 10, wherein the time required for said substrate to proceed from said forming step to said partitioning step is set to a time required for said ink receptor layer to be capable of reacting to exposure.

12. The method according to claim 10, wherein time required for said substrate to proceed from said partitioning step to said coloring step is set to a time required for the portions that absorb ink relatively easily to absorb the ink and for the ink to be maintained is a dispersible state.

13. The method according to claim 2, wherein said coloring step is performed by discharging three types of ink having different colors onto said ink receptor layer.

14. The method according to claim 1, wherein said inspection step includes detecting coloring flaws, determining whether a substrate that has been inspected is to be sent to the next step, and discharging a substrate, which has been determined to be faulty, before said drying step is performed.

15. The method according to claim 14, wherein when a substrate has been determined to be faulty at said inspection step, an operator is so notified.

16. The method according to claim 1, further comprising a temperature control step, which is interposed between said partitioning step and said coloring step, of controlling temperature of said substrate to a constant temperature in preparation for said coloring step.

17. The method according to claim 1, wherein said inkjet printing head discharges ink by utilizing thermal energy, said inkjet printing head having a thermal energy generating element for generating thermal energy applied to the ink.

18. The method according to claim 1, wherein said inkjet printing head has a plurality of ink discharge nozzles.

19. The method according to claim 1, further comprising a controlling step, wherein a controller ascertains the location of the substrate based on a signal from a sensor, and directs the substrate to undergo either said coloring step, if the substrate has uncolored portions still to be colored, or said inspection step, if all portions of the substrate to be colored have been colored.

20. A method of manufacturing a color filter by coloring a color filter substrate, comprising:
a partitioning step of partitioning the substrate into portions to be colored and portions that are not to be colored;
a coloring step of coloring the portions to be colored by discharging ink onto these portions from an ink-jet printing head;
a drying step of drying the ink discharged at said coloring step; and
a curing step of curing the portions which have been colored;
said partitioning step, said coloring step, said drying step and said curing step being performed successively in a single manufacturing line, wherein
a time required for the substrate to proceed from said coloring step to said drying step is set to a time required for the ink to disperse in the portions to be colored, and a time required for the substrate to proceed from said drying step to said curing step is set to a time during which there will be substantially no change in the properties of the ink after drying.

21. A method of manufacturing a color filter by coloring a color filter substrate, comprising:
a providing step of providing the substrate having partitioned portions to be colored and portions that are not to be colored;
a coloring step of coloring the portions to be colored by discharging ink onto these portions from an ink-jet printing head;
an inspection step of inspecting said substrate for coloring flaws;
a drying step of drying the ink discharged at said coloring step; and
a curing step of curing the portions which have been colored;
said coloring step, said inspection step, said drying step and said curing step being performed successively in a single manufacturing line, wherein
when said inspection step determines that a substrate has coloring flaws, said subsequent drying step and curing step are not performed on the substrate having coloring flaws, and such substrate is disposed as an inferior good, and wherein
a time required for the substrate to proceed from said coloring step to said drying step is set to a time required for the ink to disperse in the portions to be colored, and a time required for the substrate to proceed from said drying step to said curing step is set to a time during which there will be substantially no change in the properties of the ink after drying.

22. The method according to claim 21, further comprising a controlling step, wherein a controller ascertains the location of the substrate based on a signal from a sensor, and directs the substrate to undergo either said coloring step, if the substrate has uncolored portions still to be colored, or said inspection step, if all portions of the substrate to be colored have been colored.

23. A method of manufacturing a color filter by coloring a color filter substrate, comprising:

a providing step of providing the substrate having partitioned portions to be colored and portions that are not to be colored;

a coloring step of coloring the portions to be colored by discharging ink onto these portions from a ink-jet printing head;

a drying step of drying the ink discharged at said coloring step; and a curing step of curing the portions which have been colored;

said coloring step, said drying step and said curing step being performed successively in a single manufacturing line, wherein a time required for the substrate to proceed from said coloring step to said drying step is set to a time required for the ink to disperse in the portions to be colored, and a time required for the substrate to proceed from said drying step to said curing step is set to a time during which there will be substantially no change in the properties of the ink after drying.

* * * * *

UNITED STATES PATENT AND TRADEMARK OFFICE
CERTIFICATE OF CORRECTION

PATENT NO. : 5,989,757
DATED     : November 23, 1999
INVENTOR(S) : Tsunenobu Satoi It is certified that error appears in the above-identified patent and that said Letters Patent is hereby corrected as shown below:

ON THE COVER PAGE
[56] References Cited, "59-123670 9/1984 Japan" should read --59-123670 7/1984 Japan--;

"1217320 8/1989 Japan" should read --1-217320 8/1989 Japan--; and

"7281171 10/1995 Japan" should read --7-281171 10/1995 Japan--.

COLUMN 18
Line 38, "maybe" should read --may be--.

Signed and Sealed this

Fifth Day of December, 2000

Attest:

Q. TODD DICKINSON

Attesting Officer        Director of Patents and Trademarks